United States Patent
Jeong et al.

(10) Patent No.: US 12,078,920 B2
(45) Date of Patent: *Sep. 3, 2024

(54) PRISM MODULE, CAMERA INCLUDING SAME, AND IMAGE DISPLAY DEVICE

(71) Applicant: LG ELECTRONICS INC., Seoul (KR)

(72) Inventors: Jongwoo Jeong, Seoul (KR); Hyungjoo Kang, Seoul (KR); Youngman Kwon, Seoul (KR); Dongryeol Lee, Seoul (KR); Jayong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 819 days.

This patent is subject to a terminal disclaimer.

(21) Appl. No.: 17/272,309

(22) PCT Filed: Aug. 16, 2019

(86) PCT No.: PCT/KR2019/010409
§ 371 (c)(1),
(2) Date: Feb. 27, 2021

(87) PCT Pub. No.: WO2020/045867
PCT Pub. Date: Mar. 5, 2020

(65) Prior Publication Data
US 2021/0311372 A1    Oct. 7, 2021

(30) Foreign Application Priority Data

Aug. 30, 2018    (KR) ........................ 10-2018-0103073

(51) Int. Cl.
*G02B 26/08*    (2006.01)
*G02B 7/09*    (2021.01)
(Continued)

(52) U.S. Cl.
CPC ................. *G03B 5/00* (2013.01); *G02B 7/09* (2013.01); *G02B 7/1805* (2013.01);
(Continued)

(58) Field of Classification Search
CPC .......... G03B 5/00; G03B 13/36; G03B 13/32; G03B 2205/0007; G03B 2205/003;
(Continued)

(56) References Cited

U.S. PATENT DOCUMENTS

| | | | |
|---|---|---|---|
| 9,547,050 B2 | 1/2017 | Sartee et al. | |
| 10,334,146 B2 * | 6/2019 | Im | ........................ G02B 7/102 |

(Continued)

FOREIGN PATENT DOCUMENTS

| | | |
|---|---|---|
| JP | 2012-068339 | 4/2012 |
| JP | 2013-033179 | 2/2013 |

(Continued)

OTHER PUBLICATIONS

PCT International Application No. PCT/KR2019/010409, International Search Report dated Dec. 12, 2019, 3 pages.

(Continued)

*Primary Examiner* — Euncha P Cherry
(74) *Attorney, Agent, or Firm* — LEE, HONG, DEGERMAN, KANG & WAIMEY

(57) ABSTRACT

A present disclosure relates to a prism apparatus, a camera apparatus and an image display apparatus including same. The prism apparatus according to one embodiment of the present disclosure includes a prism holder for fixing a prism to a first surface; a yoke of which a first surface is attached to a second surface of the prism holder which is rear surface of the first surface of the prism holder; a drive magnet attached to a second surface of the yoke which is rear surface of the first surface of the yoke; a sensor magnet disposed above the yoke; a hall sensor spaced apart from the sensor (Continued)

magnet; and a sensor magnet supporter to which the sensor magnet is attached. Accordingly, the magnetic field is detected accurately.

20 Claims, 30 Drawing Sheets

(51) Int. Cl.
*G02B 7/18* (2021.01)
*G02B 13/00* (2006.01)
*G02B 27/64* (2006.01)
*G03B 5/00* (2021.01)
*G03B 13/36* (2021.01)
*H04N 23/67* (2023.01)
*H04N 23/68* (2023.01)
*G03B 13/32* (2021.01)

(52) U.S. Cl.
CPC ..... *G02B 13/0065* (2013.01); *G02B 26/0883* (2013.01); *G02B 27/646* (2013.01); *G03B 13/36* (2013.01); *H04N 23/67* (2023.01); *H04N 23/6812* (2023.01); *H04N 23/686* (2023.01); *G03B 13/32* (2013.01); *G03B 2205/0007* (2013.01); *G03B 2205/003* (2013.01); *G03B 2205/0069* (2013.01)

(58) Field of Classification Search
CPC .. G03B 2205/0069; G03B 30/00; G02B 7/09; G02B 7/1805; G02B 13/0065; G02B 26/0883; G02B 27/646; G02B 5/04; H04N 23/67; H04N 23/6812; H04N 23/686; H04N 23/00; H04N 23/55; H04N 23/57; H04N 23/685
See application file for complete search history.

(56) References Cited

U.S. PATENT DOCUMENTS

| | | | | |
|---|---|---|---|---|
| 2013/0278785 | A1* | 10/2013 | Nomura | G02B 7/102 |
| | | | | 348/208.11 |
| 2014/0146392 | A1 | 5/2014 | Fujinaka | |
| 2021/0373282 | A1* | 12/2021 | Jeong | H04N 23/00 |

FOREIGN PATENT DOCUMENTS

| | | |
|---|---|---|
| KR | 10-2010-0070225 | 6/2010 |
| KR | 10-2018-0003539 | 1/2018 |
| KR | 10-2018-0024145 | 3/2018 |
| KR | 10-2018-0085460 | 7/2018 |

OTHER PUBLICATIONS

Korean Intellectual Property Office Application No. 10-2018-0103073, Office Action dated Jul. 11, 2022, 4 pages.
Korean Intellectual Property Office Application No. 10-2018-0103073, Notice of Allowance dated Jul. 4, 2023, 2 pages.

* cited by examiner

PRISM MODULE, CAMERA INCLUDING SAME, AND IMAGE DISPLAY DEVICE

CROSS-REFERENCE TO RELATED APPLICATIONS

This application is the National Stage filing under 35 U.S.C. 371 of International Application No. PCT/KR2019/010409, filed on Aug. 16, 2019, which claims the benefit of earlier filing date and right of priority to KR Application No. 10-2018-0103073, filed on Aug. 30, 2018, the contents of which is hereby incorporated by reference herein in its entirety.

BACKGROUND OF THE INVENTION

1. Field of the Invention

The present disclosure relates to a prism apparatus, camera and image display apparatus including same, more specifically, to a prism apparatus, camera and image display apparatus including same which may detect the magnetic field precisely.

2. Description of the Related Art

A camera is an apparatus for photographing an image. Recently, as a camera is employed in a mobile terminal, the research on the downsizing of a camera has been progressed.

Meanwhile, in addition to the downsizing trend of the camera, an auto focus function and an optical image stabilization (OIS) function are adopted.

Particularly, for performing optical image stabilization (OIS) function, it is important to accurately detect and compensate movement of dual prism caused by hand tremble.

SUMMARY OF THE INVENTION

The purpose of the present disclosure is to provide a lens prism apparatus detecting the magnetic field precisely and the camera, and image display apparatus having the same.

Another purpose of the disclosure is to provide the prism apparatus detecting the magnetic field for the vibration reduction and realizing the vibration reduction function to compensate the vibration reduction, and the camera, the image display apparatus including same.

Another purpose of the disclosure is to provide the prism apparatus realizing a slim camera, and the camera, the image display apparatus including same.

To achieve above purposes, a prism apparatus according to one embodiment of the present disclosure comprises a prism holder for fixing a prism to a first surface, a yoke of which a first surface is attached to a second surface of the prism holder which is rear surface of the first surface of the prism holder, a drive magnet attached to a second surface of the yoke which is rear surface of the first surface of the yoke, a sensor magnet disposed above the yoke, a hall sensor spaced apart from the sensor magnet and a sensor magnet supporter to which the sensor magnet is attached.

Meanwhile, wherein the sensor magnet supporter and the yoke contact with each other.

Meanwhile, wherein the sensor magnet is disposed at the sensor magnet supporter, wherein a first surface of the sensor magnet is exposed to an outside.

Meanwhile, wherein the sensor magnet is disposed at the sensor magnet supporter, wherein a first surface and a second surface of the sensor magnet is exposed to an outside.

Meanwhile, wherein the sensor magnet supporter and the sensor magnet are contacted with the yoke.

Meanwhile, wherein a distance between the sensor magnet and the hall sensor is preferably less than a width of the sensor magnet.

Meanwhile, wherein a width of the sensor magnet is preferably greater than a width of the sensor magnet supporter.

To achieve above purposes, a camera and an image display apparatus according to one embodiment of the present disclosure includes a gyro sensor sensing a motion, a prism apparatus changing the angle of a light, input to compensate the motion sensed by the gyro sensor, about a first axis and a second axis and then outputting the changed light, a lens apparatus having a plurality of lenses and realizing variable focus by moving at least one of the lenses and outputting the light from the prism apparatus by using the moving lens and an image sensor converting the light from the lens apparatus to an electric signal, wherein the prism apparatus comprises a first prism module including a first prism and changing the angle of the first prism to compensate for hand tremble in a first direction, a second prism module including a second prism and changing the angle of the second prism to compensate for hand tremble in a second direction, wherein at least one of the first prism module and the second prism module includes the sensor magnet supporter to which the sensor magnet is attached.

DETAILED DESCRIPTION OF THE PREFERRED EMBODIMENTS

Hereinafter, the present disclosure will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
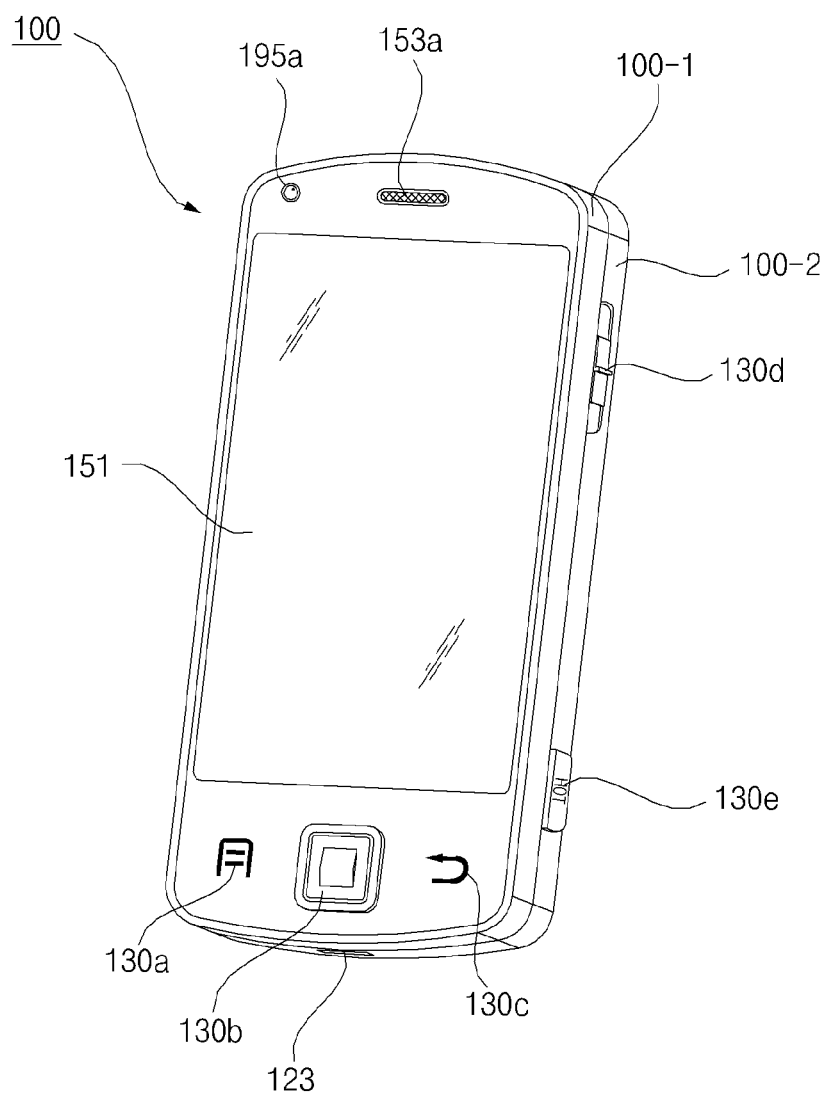
FIG. 1A is a perspective view of a mobile terminal as an example of an image display apparatus according to an embodiment of the present disclosure.
Figure 1B:
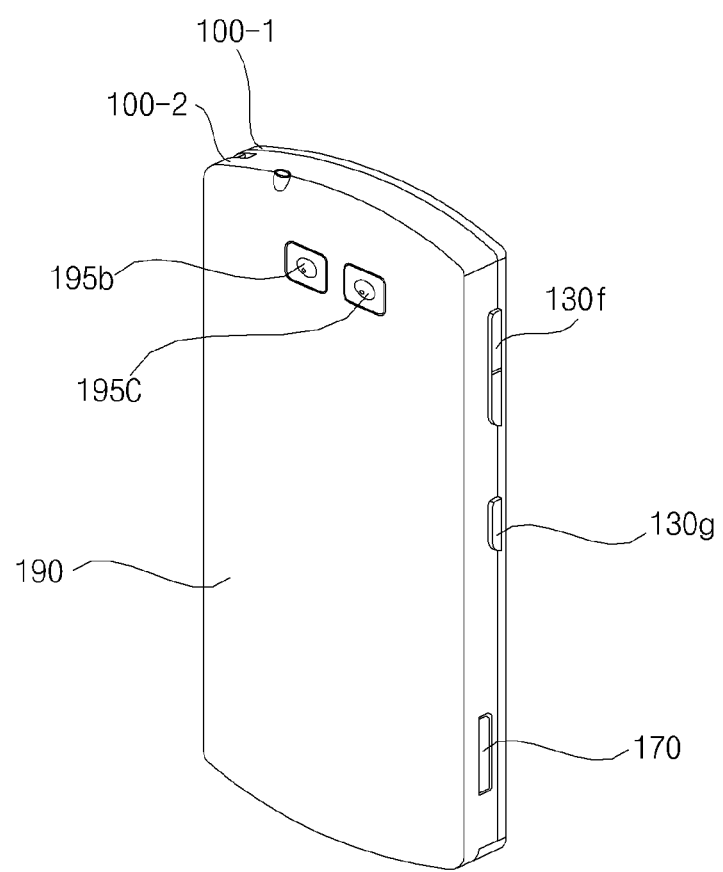
FIG. 1B is a rear perspective view of the mobile terminal shown in FIG. 1A.

FIG. 1A is a perspective view of a mobile terminal as an example of an image display apparatus according to an embodiment of the present disclosure, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, and a first to third user input units 130a, 130b, and 130c may be disposed in the front case 100-1. Further, a fourth user input unit 130d, a fifth user input unit 130e, and a first to third microphones 123a, 123b, and 123c may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input units 130a, 130b, 130c, 130d and 130e and the sixth and seventh user input units 130f and 130g described below may be collectively referred to as a user input unit 130.

The first microphone 123a and the second microphone 123b may be disposed in the upper side of the rear case 100-2, i.e., in the upper side of the mobile terminal 100, so as to collect an audio signal, and the third microphone 123c may be disposed in the lower side of the rear case 100-2, i.e., in the lower side of the mobile terminal 100, so as to collect an audio signal Referring to FIG. 1B, a second camera 195b, a third camera 195c, and a fourth microphone 123d may be additionally mounted on the rear surface of the rear case 100-2, and a sixth and seventh user input units 130f and 130g, and an interface 175 may be disposed on the side surface of the rear case 100-2.

The second camera 195b has a photographing direction substantially opposite to that of the first camera 195a, and may comprise different pixels from the first camera 195a. A flash (not shown) and a mirror (not shown) may be additionally disposed adjacent to the second camera 195b. In addition, another camera may be installed adjacent to the second camera 195b to be used for shooting a three-dimensional stereoscopic image.

A second sound output module (not shown) may be additionally disposed in the rear case 100-2. The second sound output module may implement a stereo function together with the first sound output module 153a, and may be used for talking in a speakerphone mode.

A power supply unit 190 for supplying power to the mobile terminal 100 may be mounted in the rear case 100-2. The power supply unit 190 may be, for example, a rechargeable battery and may be detachably coupled to the rear case 100-2 for charging or the like.

The fourth microphone 123d may be disposed in the front surface of the rear case 100-2, i.e., in the rear surface of the mobile terminal 100 so as to collect an audio signal.

Figure 2:
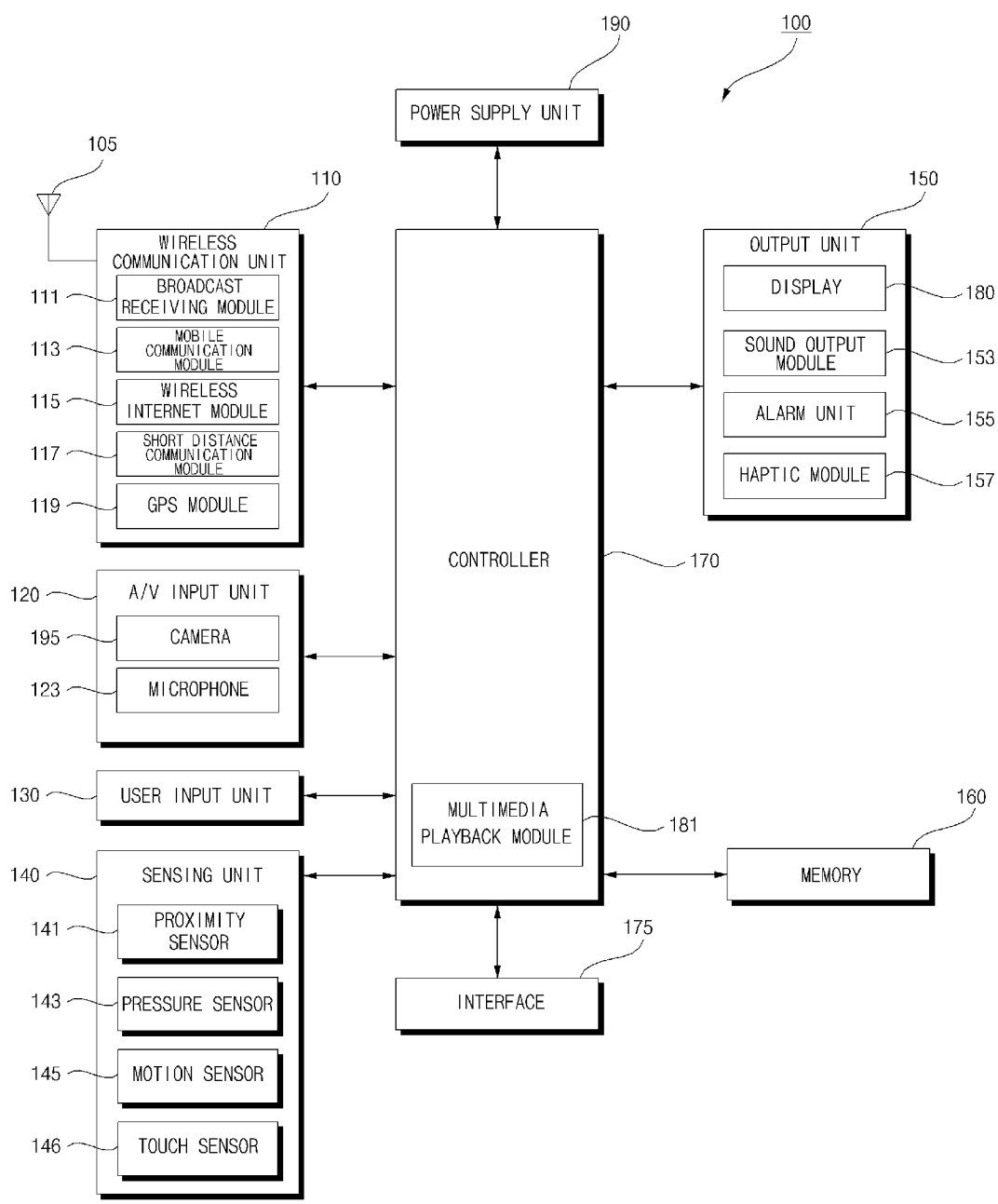
FIG. 2 is a block diagram of the mobile terminal of FIG. 1.

FIG. 2 is a block diagram of the mobile terminal of FIG. 1.

Referring to FIG. 2, the mobile terminal 100 may include a wireless communication unit 110, an audio/video (A/V) input unit 120, a user input unit 130, a sensing unit 140, an output unit 150, a memory 160, an interface 175, a controller 170, and a power supply unit 190. When these components are implemented in an actual application, two or more components may be combined into one component if necessary, or one component may be divided into two or more components.

The wireless communication unit 110 may include a broadcast receiving module 111, a mobile communication module 113, a wireless Internet module 115, a short distance communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. Bluetooth, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input unit 120 may be used to input an audio signal or a video signal, and may include the camera 195, the microphone 123, and the like.

The camera 195 may process an image frame such as a still image or a moving image obtained by an image sensor in a video call mode or a photographing mode. Then, the processed image frame may be displayed on the display 180.

The image frame processed by the camera 195 may be stored in the memory 160 or transmitted to the outside through the wireless communication unit 110. Two or more cameras 195 may be provided according to the configuration of the terminal.

The microphone 123 may receive an external audio signal by the microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input unit 130 may generate key input data that the user inputs for controlling the operation of the terminal. The user input unit 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing unit 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing unit 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for detecting position information and intensity information of the touch input. A sensing signal detected by the touch sensor 146 may be transmitted to the controller 180.

The output unit 150 may be used to output an audio signal, a video signal, or an alarm signal. The output unit 150 may include a display 180, an sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communication unit 110 or stored in the memory 160 in a call signal reception, a call mode or a recording mode, a voice recognition mode, a broadcast reception mode, and the like. The sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a form other than an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized and outputted or sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external devices connected to the mobile terminal 100. The interface 175 may receive data from an external device or receive power from the external device to transmit to each component in the mobile terminal 100, and allow the data in the mobile terminal 100 to be transmitted to the external device.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia play module 181 for playing multimedia. The multimedia play module 181 may be configured in hardware inside the controller 170 or may be configured in software separately from the controller 170. Meanwhile, the controller 170 may include an application processor (not shown) for driving an application. Alternatively, the application processor (not shown) may be provided separately from the controller 170.

The power supply unit 190 may receive external power or internal power under the control of the controller 170 to supply power required for operation of each component.

Figure 3A:
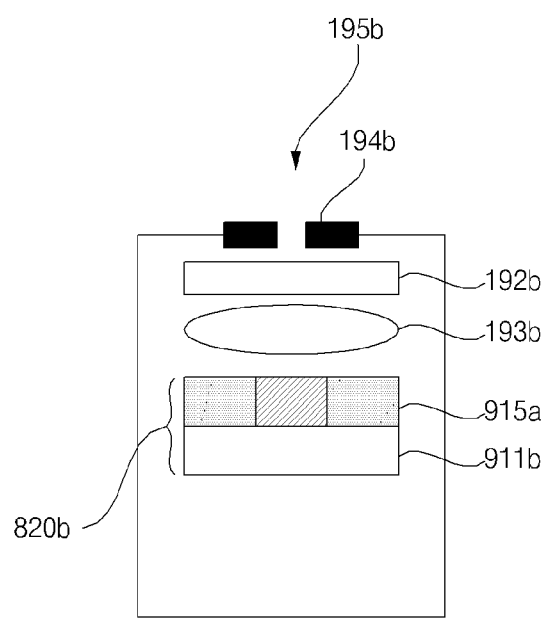
FIG. 3A is an internal cross-sectional view of the camera of FIG. 2.

FIG. 3A is an internal cross-sectional view of the camera of FIG. 2.

Referring to the drawing, FIG. 3A is an example of a cross-sectional view of a second camera 195*b* inside the camera 195.

The second camera 195*b* may include an aperture 194*b*, a prism apparatus 192*b*, a lens apparatus 193*b*, and an image sensor 820*b*.

The aperture 194*b* may open and close the light incident on the lens apparatus 193*b*.

The image sensor 820*b* may include an RGb filter 915*b*, and a sensor array 911*b* for converting an optical signal into an electric signal, in order to sense RGB colors.

Accordingly, the image sensor 820*b* may sense and output RGB images, respectively.

Figure 3B:
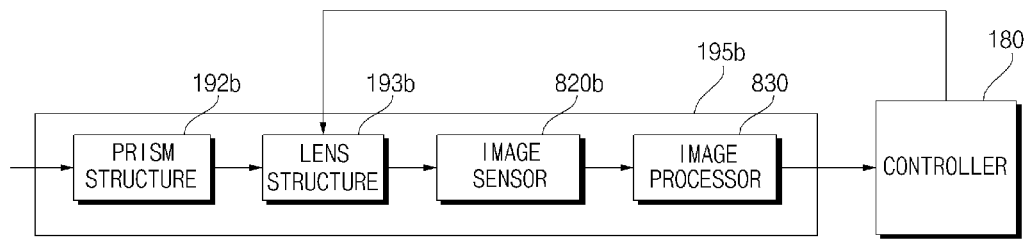
FIG. 3B is an internal block diagram of the camera of FIG. 2.

FIG. 3B is an internal block diagram of the camera of FIG. 2

Referring to the drawing, FIG. 3B is an example of a block diagram for the second camera 195*b* inside the camera 195.

The second camera 195*b* may include the prism apparatus 192*b*, the lens apparatus 193*b*, the image sensor 820*b*, and an image processor 830.

The image processor 830 may generate an RGB image based on an electrical signal from the image sensor 820*b*.

Meanwhile, the image sensor 820*b* may adjust an exposure time based on the electric signal.

Meanwhile, the RGB image from the image processor 830 may be transmitted to the controller 180 of the mobile terminal 100.

Meanwhile, the controller 180 of the mobile terminal 100 may output a control signal to the lens apparatus 193*b* for motion of a lens in the lens apparatus 193*b*. For example, a control signal for autofocusing may be output to the lens apparatus 193*b*.

Meanwhile, the controller 180 of the mobile terminal 100 may output a control signal for the optical image stabilization (OIS) function in the prism apparatus 192*b* to the prism apparatus 192*b*.

Figure 3C:
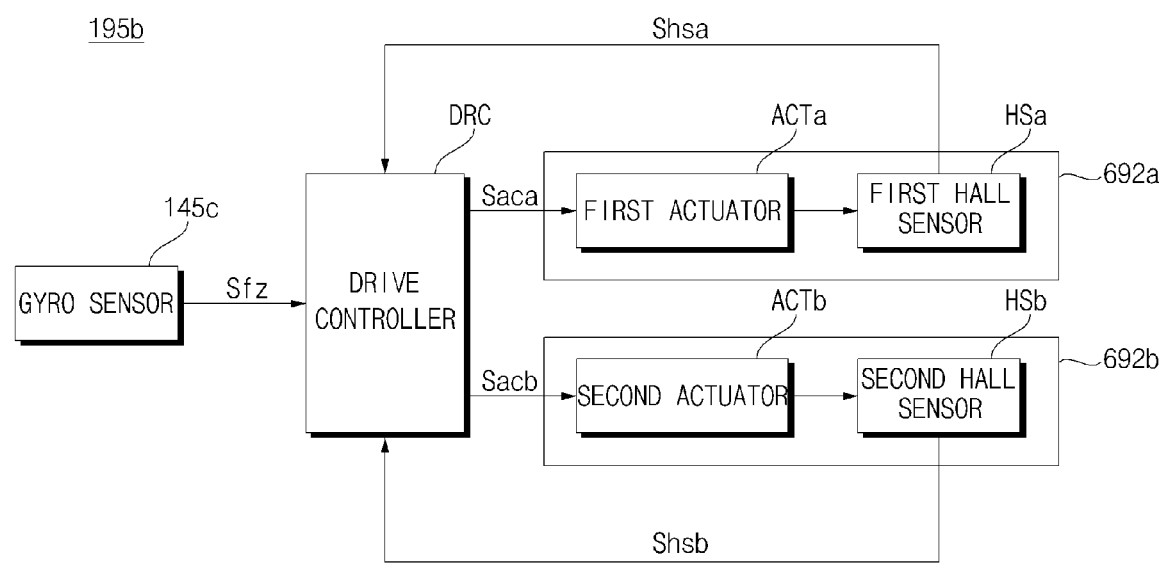
FIG. 3C and FIG. 3D are various examples of the internal block diagram of the camera of FIG. 2.
Figure 3D:
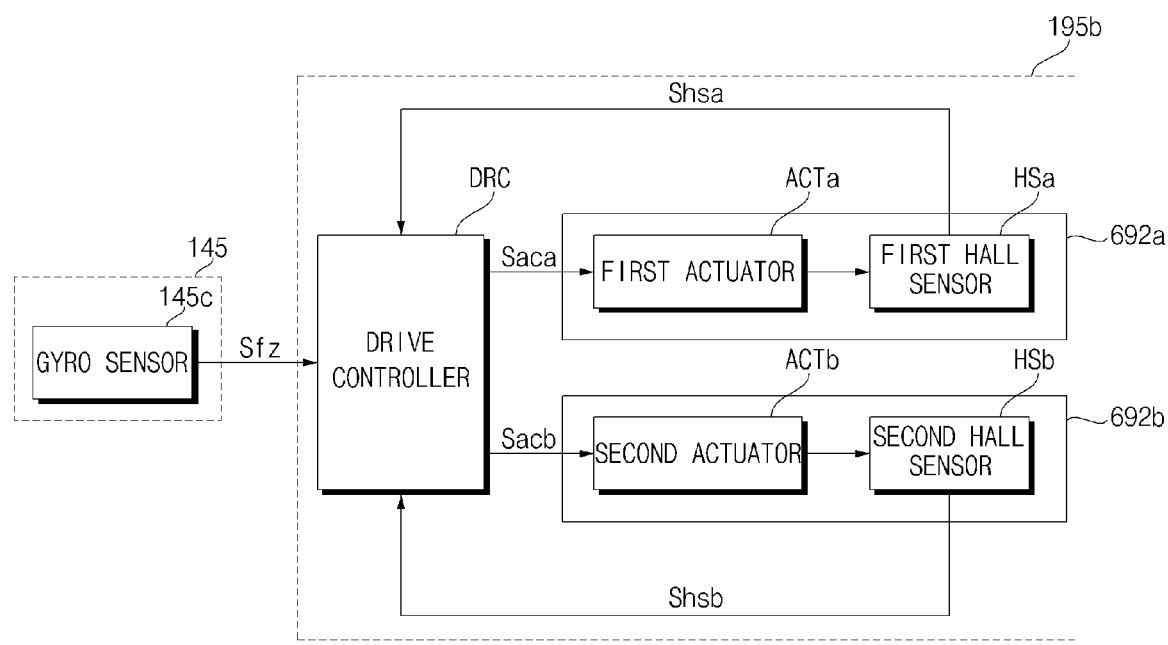

FIG. 3C and FIG. 3D are various examples of the internal block diagram of the camera of FIG. 2.

Firstly, FIG. 3C illustrates that a gyro sensor 145*c*, a drive controller DRC, a first prism module 692*a*, and a second prism module 692*b* are provided inside the camera 195*b*.

The gyro sensor 145*c* may detect a first direction motion and a second direction motion. The gyro sensor 145*c* may output motion information Sfz including the first direction motion and the second direction motion.

The drive controller DRC may output control signals Saca and Sacb for the motion compensation to a first prism module 692*a* and a second prism module 692*b* respectively, based on motion information Sfz including a first direction motion and a second direction motion from the gyro sensor 145*c*.

In particular, the drive controller DRC may output the control signal to a first actuator ACTa and a second actuator ACTb in the first prism module 692*a* and the second prism module 692*b*.

A first control signal Saca may be a control signal for the compensation of the first direction motion sensed by the gyro sensor 145*c*, and a second control signal Sacb may be a control signal for the compensation of the second direction motion sensed by the gyro sensor 145*c*.

The first actuator ACTa may change the angle of a first prism PSMa based on a first rotation axis, based on the first control signal Saca.

The second actuator ACTb may change the angle of a second prism PSMb based on a second rotation axis, based on the second control signal Sacb.

Meanwhile, a first hall sensor HSa in the first prism module 692*a* and a second hall sensor Hsb in the second prism module 692*b* may sense the change of the magnetic field so as to check movement information due to the movement of the first prism PSMa and the second prism PSMb.

The motion information detected by the first hall sensor HSa and the second hall sensor Hsb, particularly, first and second magnetic field or change of the magnetic field information Shsa and Shsb, may be input to the DRC.

The drive controller DRC may perform a PI control or the like, based on the control signals Saca and Sacb for the motion compensation and the motion information, particularly, the first and second magnetic field or change of the magnetic field information Shsa and Shsb, thereby accurately controlling the motion of the first prism PSMa and the second prism PSMb.

That is, the drive controller DRC may perform a closed loop by receiving the information Shsa and Shsb detected by the first hall sensor HSa and the second hall sensor Hsb, and can accurately control the motion of the first prism PSMa and the second prism PSMb.

Next, although FIG. 3D is similar to FIG. 3C, there exists a difference in that the gyro sensor 145*c* is provided not in the camera 195*b* but in the motion sensor 145 of a separate sensing unit 140 inside the mobile terminal 100.

Accordingly, although not shown in FIG. 3D, the camera 195*b* in FIG. 3D may further include an interface (not shown) for receiving a signal from an external gyro sensor 145*c*.

Meanwhile, the motion information Sfz including the first directional motion and the second direction motion received from the gyro sensor 145*c* may be input to the drive controller DRC. The operation of the drive controller may be the same as that of FIG. 3C.

Figure 4A:
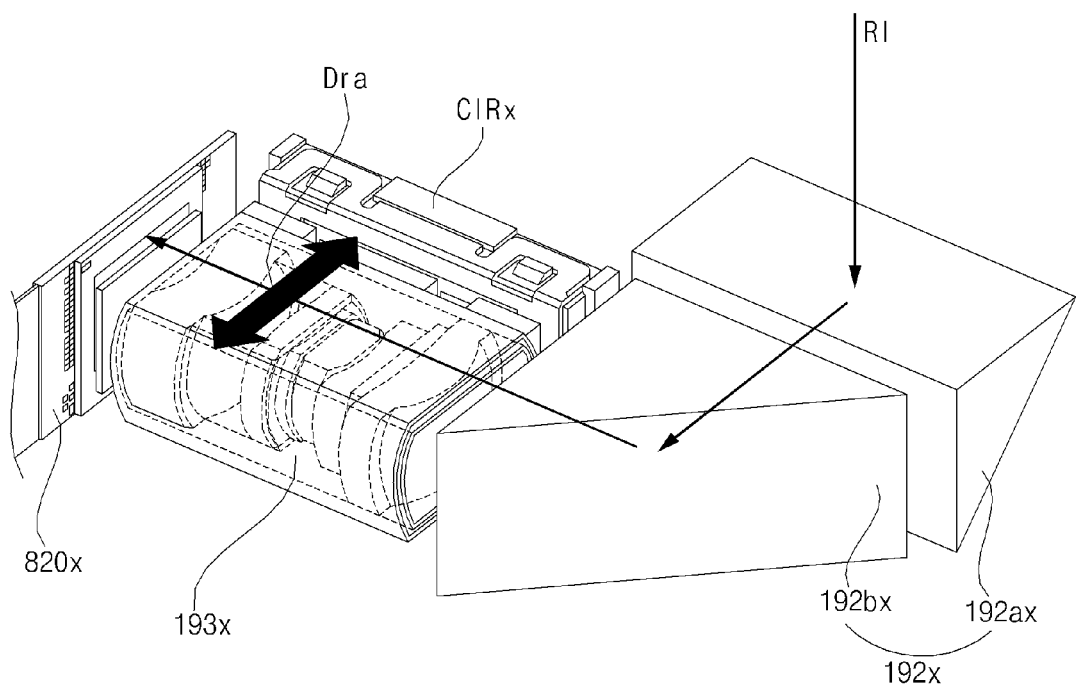
FIG. 4A is a diagram illustrating a camera apparatus having a dual prism apparatus.

FIG. 4A is a diagram illustrating a camera apparatus having a dual prism apparatus.

Referring to the drawing, a camera 195*x* of FIG. 4A may include an image sensor 820*x*, a lens apparatus 193*x* for transmitting light to the image sensor, a lens driving unit (CIRx) for moving a lens inside the lens apparatus 193*x*, and a dual prism apparatus 192*bx* having a first prism 192*ax* and a second prism 192*bx*.

The camera 195*x* of FIG. 4A may perform the movement of the lens apparatus 193*x* in order to perform optical image stabilization (OIS). In the drawing, it is illustrated that the compensation is performed in the Dra direction.

This method has a disadvantage that, when the optical zoom of the lens apparatus 193*x* is high, the optical image stabilization (OIS) should be performed more. Therefore, the accuracy of the optical image stabilization (OIS) may be reduced.

In addition, in this case, the lens movement direction should intersect with the Dra direction, so that it is difficult to simultaneously achieve the lens movement and the movement for performing optical image stabilization (OIS).

In the present disclosure, in order to compensate for this, it is assumed that the optical image stabilization (OIS) is implemented inside the prism module, and the angle compensation is performed, in particular, by using a rotary actuator. According to this, by performing the angle compensation, there is an advantage that it is enough to compensate only an angle within a given range, regardless of whether the optical zoom of the lens apparatus 193*x* is low or high. For example, a plurality of prism modules may be used to compensate a first angle in first and second rotational axis directions, respectively. Accordingly, regardless of the optical zoom, since the angle compensation within a given range becomes possible, the accuracy of optical image stabilization (OIS) can be improved. This will be described with reference to FIG. 5A.

Figure 4B:
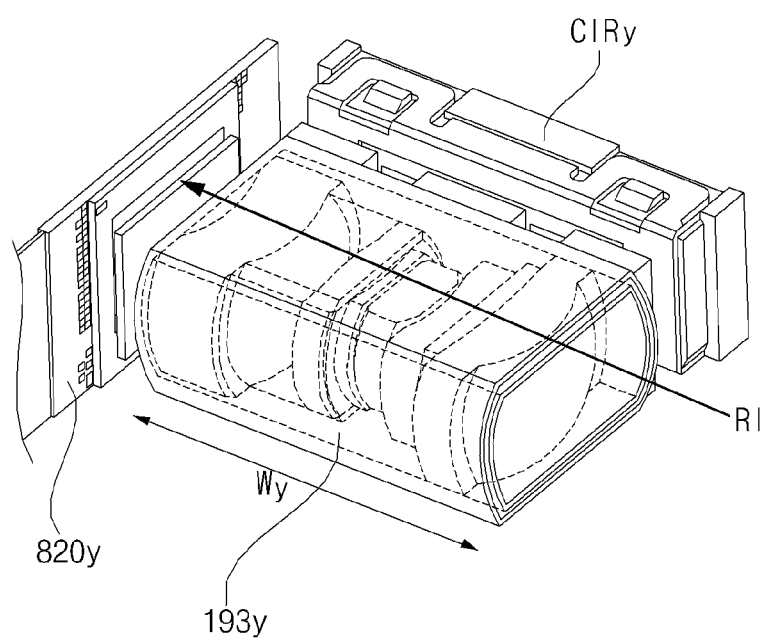
FIG. 4B and FIG. 4C are diagrams illustrating a camera apparatus in which a dual prism apparatus is omitted.
Figure 4C:
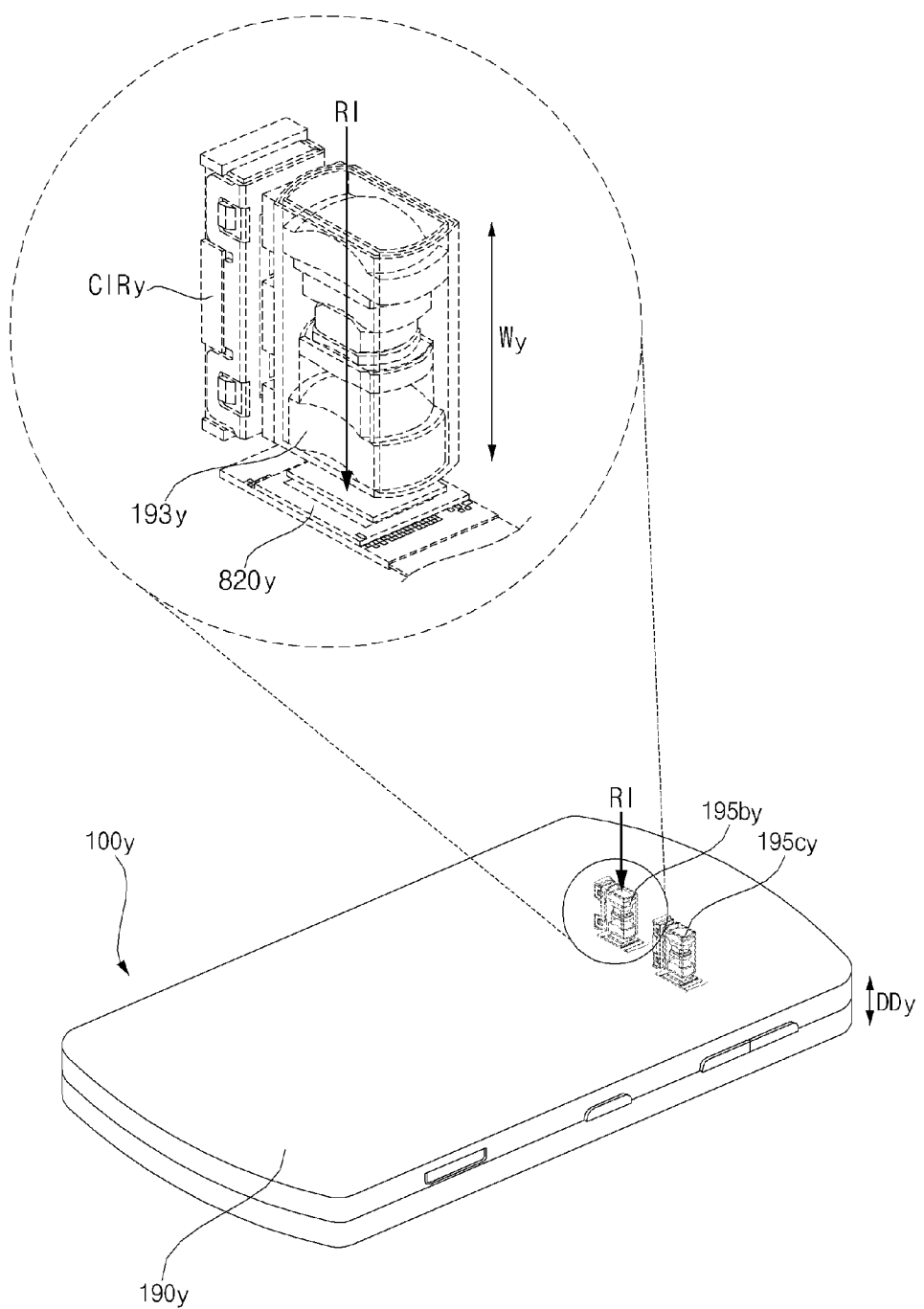

FIG. 4B and FIG. 4C are diagrams illustrating a camera apparatus in which a dual prism apparatus is omitted.

Referring to the drawing, a camera 195*y* of FIG. 4B may include an image sensor 820*y*, a lens apparatus 193*y* for transmitting light to the image sensor, and a lens driving unit (CIRx) for moving a lens inside the lens apparatus 193*y*.

Meanwhile, since the camera 195*y* of FIG. 4B does not have a plurality of prism apparatus, input light RI may be directly input through the lens apparatus 193*y*, so that the lens apparatus 193*y* and the image sensor 820*y* should be disposed perpendicular to the input light RI.

That is, in a mobile terminal 100*y* of FIG. 4C, input light RI may be transmitted to the image sensor 820*y* via the lens apparatus 193*y*.

Recently, the length Wy of the lens apparatus 193y increases according to the trend of high image quality and high performance. With this structure, there is a disadvantage that, as the length Wy of the lens apparatus 193y increases, the thickness DDy of the mobile terminal 100y becomes larger.

Accordingly, in order to solve this problem, in the present disclosure, a dual prism may be employed, and the first prism and the second prism may be disposed to intersect with each other such that the light (RI) path of the first prism and the light path of the second prism are different. According to this structure, it is possible to implement an L-type camera, and thus a slim camera having a reduced thickness can be implemented. This will be described with reference to FIG. 5A.

Figure 5A:
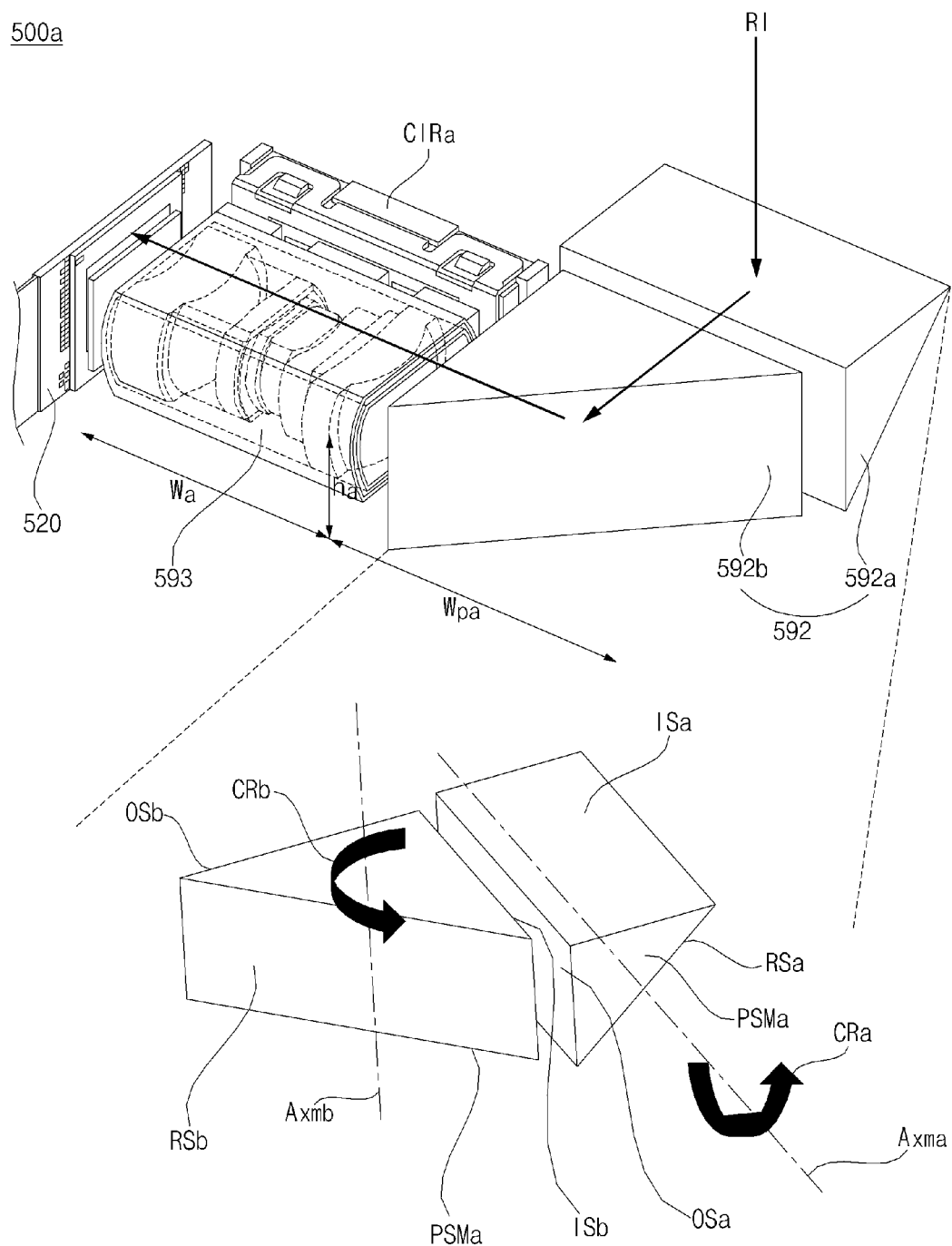
FIG. 5A is a diagram illustrating an example of a camera having a rotatable dual prism module according to an embodiment of the present disclosure.
Figure 5B:
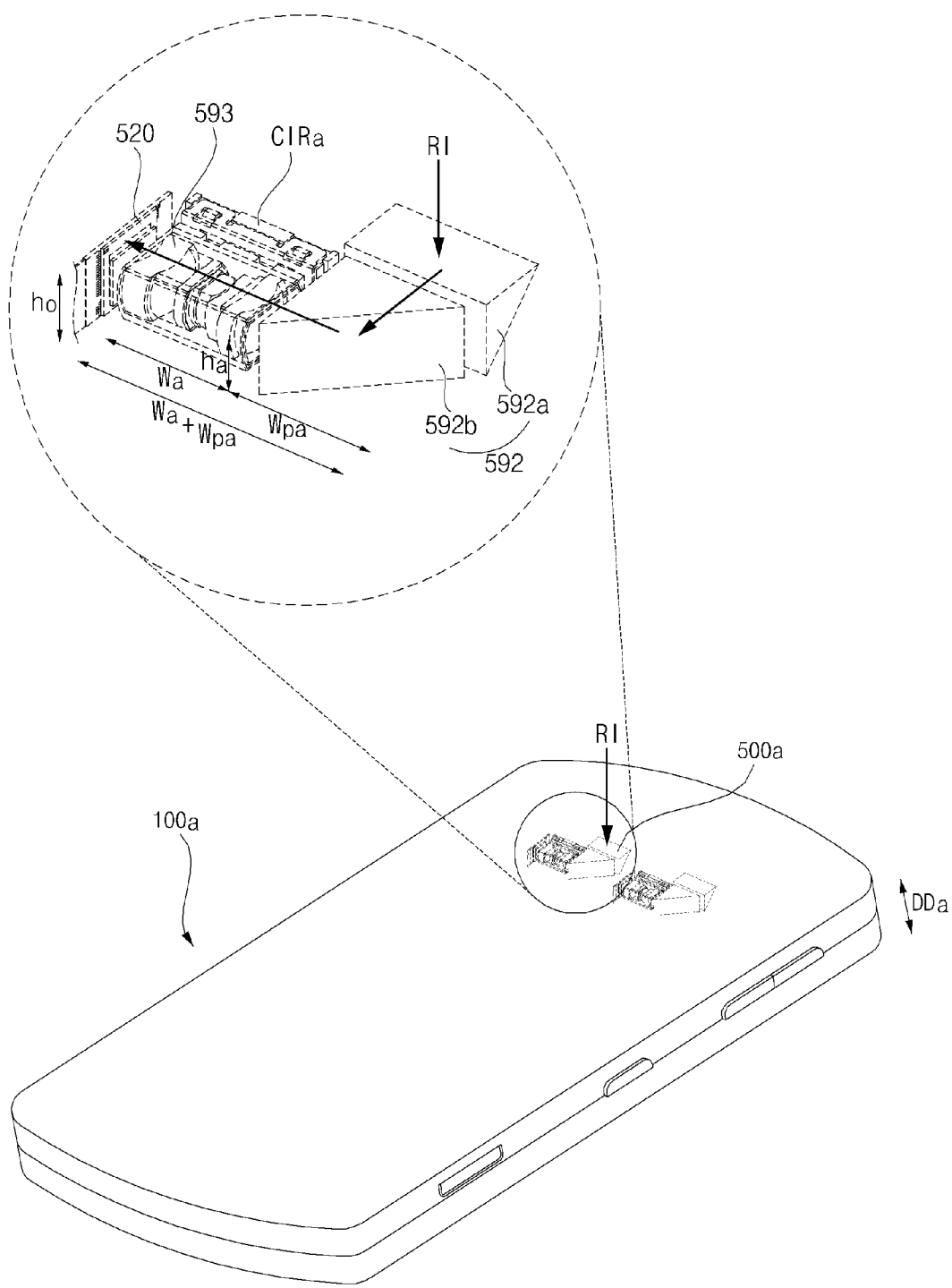
FIG. 5B is a diagram illustrating a mobile terminal having the camera of FIG. 5A.

FIG. 5A is a diagram illustrating an example of a camera apparatus having a rotatable dual prism module according to an embodiment of the present disclosure, and FIG. 5B is a diagram illustrating a mobile terminal having the camera of FIG. 5A Referring to the drawing, a camera 500a of FIG. 5A may include an image sensor 520, a lens apparatus 593 for transmitting light to the image sensor 520, and a dual prism apparatus 592 having a first prism module 592a and a second prism module 592b.

The dual prism apparatus 592 may differ from FIG. 4A in that it is rotated to achieve optical image stabilization (OIS) function.

Meanwhile, unlike FIG. 4A, since the lens apparatus 593 is not provided with an optical image stabilization (OIS) function, it can be implemented more slimly.

The lens apparatus 593 may comprise at least one lens, and the lens may be moved for variable focus.

For example, the lens apparatus 593 may be provided with a plurality of lenses such as a concave lens and a convex lens, and may move at least one of internal lenses so as to achieve variable focus, based on a control signal from the image processor 830 or the controller 180. In particular, it may be moved to the image sensor 820b or in a direction opposite to the image sensor 820b.

Meanwhile, FIG. 5A illustrates that the image sensor 520, the lens apparatus 593, and the dual prism apparatus 592 are sequentially arranged, and the light incident on the dual prism apparatus 592 is transmitted to the lens apparatus 593 and the image sensor 520. However, the present disclosure is not limited thereto.

Specifically, the light from the above may be reflected by a an internal first reflective surface RSa of the first prism PSMa in the first prism module 592a and may be transmitted to the second prism module 592b, and may be reflected by an internal second reflective surface RSb of the second prism PSMb in the second prism module 592b and may be transmitted to the lens apparatus 593 and the image sensor 520.

That is, unlike FIG. 5A, the image sensor 520, the dual prism apparatus 592, and the lens apparatus 593 may be sequentially arranged, and the light incident on the lens apparatus 593 may be transmitted the dual prism apparatus 592 and the image sensor 520.

The dual prism apparatus 592 may include the first prism PSMa, the first prism module 592a having a first rotational actuator ACTa changing the angle of the first prism PSMa toward a first direction for compensating the hand tremble, the second prism PSMb, a second prism module 592b having a second rotational actuator ACTb changing the angle of the second prism toward a second direction for compensating the hand tremble.

The first prism PSMa may comprise an internal first reflective surface RSa and the second prism PSMb comprises an internal second reflective surface RSb configured to reflect the light.

The first prism PSMa may receive the input light through a first entry prism surface ISa and output the input light reflected from the internal first reflective surface RSa through a first exit prism surface OSa, and the second prism PSMb may receive the reflected light through a second entry prism surface ISb and output the reflected light reflected from the internal second reflective surface RSb through a second exit prism surface OSb.

The first prism PSMa and second prism PSMb are configured such that the first exit prism surface OSa faces the second entry prism surface ISb.

The first rotation axis Axma of the first prism PSMa may be perpendicular to the second rotation axis Axmb of the second prism PSMb.

At this time, it is preferable that the first prism PSMa and the second prism PSMb intersect with each other. In particular, it is preferable that the first prism PSMa and the second prism PSMb are disposed perpendicular to each other.

Meanwhile, the refractive indices of the first prism PSMa and the second prism PSMb may be 1.7 or more. Accordingly, a total reflection may be performed in the first prism PSMa and the second prism PSMb, and thus, the light RI can be transmitted in the direction of the image sensor.

The refractive indices of the first prism PSMa and the second prism PSMb may be less than 1.7, and a reflective coating may be formed on a reflective surface of the second prism PSMb, the second substrate PSMb. Accordingly, a total reflection can be performed in the first prism PSMa and the second prism PSMb, and thus, the light RI can be transmitted in the direction of the image sensor.

According to this, the image sensor 520, the lens apparatus 593, and the first prism module 592a may be disposed side by side in one direction, while the second prism module 592b is disposed to intersect with the first prism module 592a.

Accordingly, the first prism module 592a and the second prism module 592b may be referred to as an L-type dual prism apparatus 592. In addition, the camera 500a having this structure may be referred to as an L-type camera.

According to this structure, through the first prism module 592a and the second prism module 592b, a rotation may occur in a first direction CRa, e.g., in a counterclockwise direction ccw based on a first rotation axis Axma and a rotation may occur in a second direction CRb, e.g., in a counterclockwise direction ccw based on a second rotation axis Axmb to perform the angle compensation, thereby achieving the optical image stabilization (OIS) function.

For example, in response to a movement causing rotation of the first prism PSMa about the first rotation axis Axma by a first angle $\theta 1$ and rotation of the second prism PSMb about the second rotation axis Axmb by a second angle $\theta 2$, the first actuator ACTa is configured to rotate the first prism PSMa in a third direction opposite the first direction by a third angle $\theta 3$ in response to the first control signal Saca, the second actuator ACTb is configured to rotate the second prism PSMb in a fourth direction opposite the second direction by a fourth angle in response to the second control signal Sacb, the third angle $\theta 3$ may be half of the first angle $\theta 1$, and the fourth angle may be half of the second angle $\theta 2$.

In particular, since angular compensation is performed by using the first actuator ACTa and the second actuator ACTb, there is an advantage that it is enough to compensate only an angle within a given range, regardless of whether the optical zoom of the lens apparatus 593 is a low magnification or a high magnification. Hence, regardless of the optical zoom, the accuracy of optical image stabilization (OIS) can be improved.

In addition, since an optimal space arrangement can be accomplished in a limited space, a slim camera 500a can be implemented. Therefore, the present disclosure can be applied to the mobile terminal 100, and the like.

FIG. 5A illustrates that the length of the lens apparatus 593 is denoted by Wa and the length of the dual prism apparatus 592 is denoted by Wpa, and the heights of the lens apparatus 593 and the dual prism apparatus 592 are denoted by ha.

Since the first prism module 592a and the second prism module 592b in the dual prism apparatus 592 are disposed to intersect with each other, as shown in the mobile terminal 100a of FIG. 5B, the movement direction of the incident light RI may be changed twice through the first prism module 592a and the second prism module 592b, and the image sensor 520 can be disposed in the left side of the mobile terminal 100a. In particular, the image sensor 520 may be disposed opposite the lateral side of the mobile terminal 100a.

Therefore, the thickness DDa of the mobile terminal 100y may be determined not by the sum (Wa+Wpa) of the lengths of the lens apparatus 593 and the dual prism apparatus 592, but by the height ha of the lens apparatus 593 and the dual prism apparatus 592 or the height ho of the image sensor.

Accordingly, as the height ha of the lens apparatus 593 and the dual prism apparatus 592 or the height ho of the image sensor is designed to be low, the thickness DDa of the mobile terminal 100y can be slimly implemented. Accordingly, the slim camera 500a having a thin thickness and a mobile terminal having the slim camera 500a can be implemented.

Figure 6A:
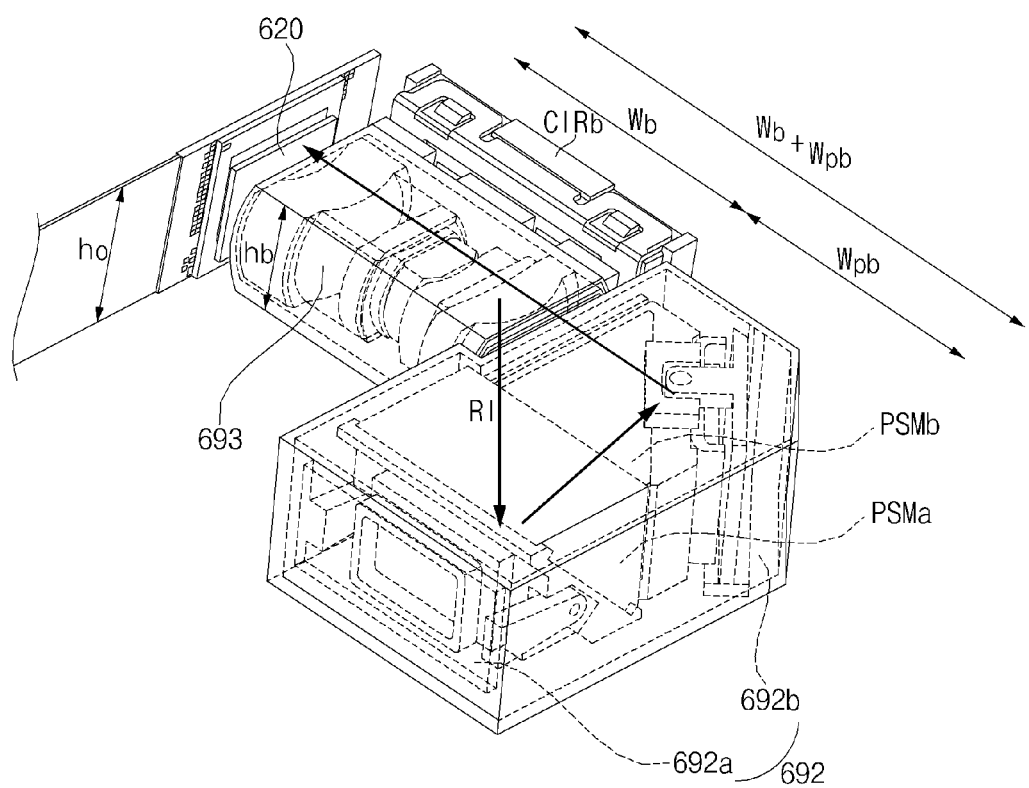
FIG. 6A is a diagram illustrating another example of a camera having a rotatable dual prism module according to an embodiment of the present disclosure.
Figure 6B:
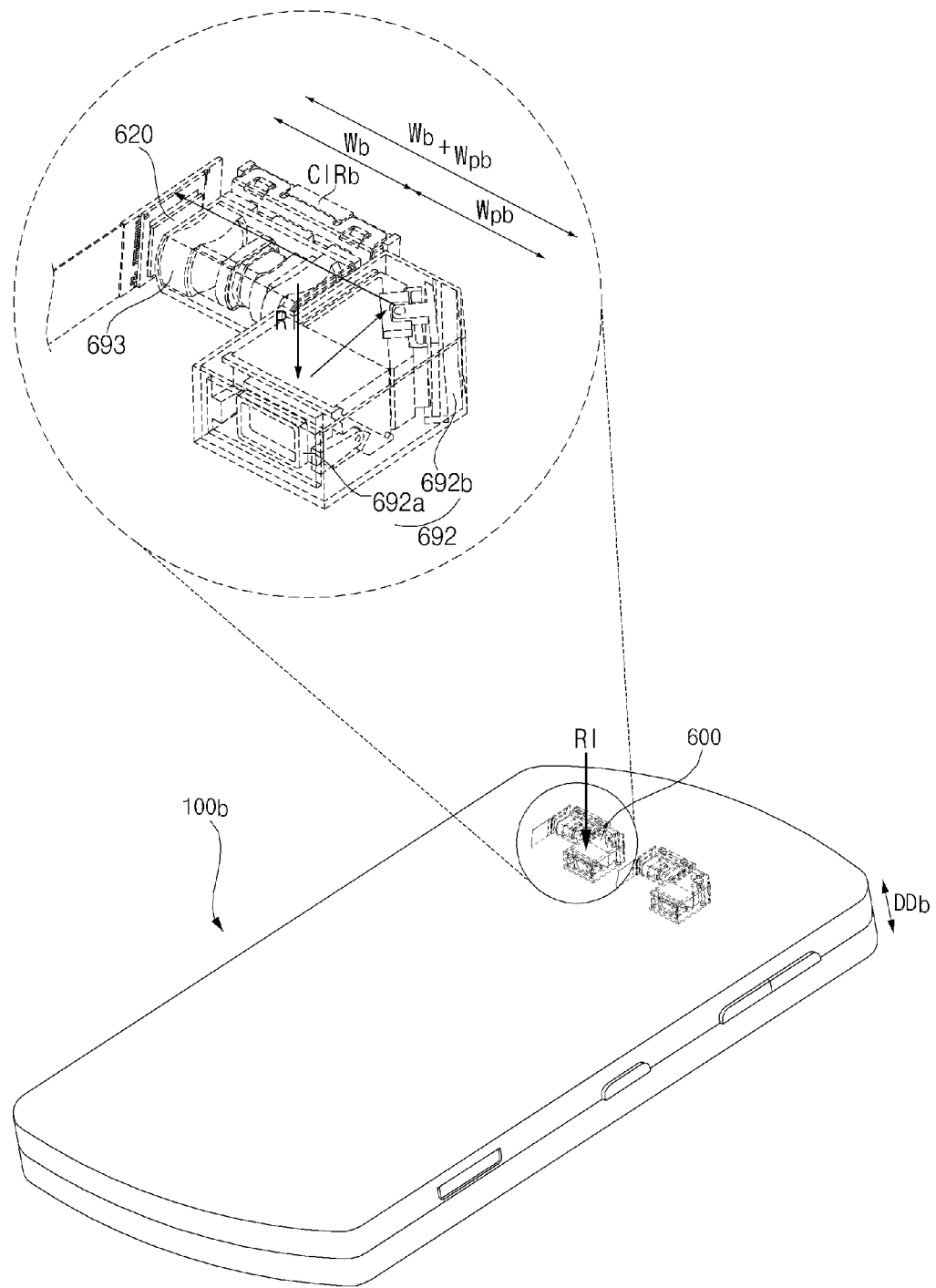
FIG. 6B is a diagram illustrating a mobile terminal having the camera of FIG. 6A.

FIG. 6A is a diagram illustrating another example of a camera apparatus having a rotatable dual prism module according to an embodiment of the present disclosure, FIG. 6B is a diagram illustrating a mobile terminal having the camera of FIG. 6A, and FIG. 7 to FIG. 9C are referred for the explanation of the camera.

Referring to the drawing, a camera 600 of FIG. 6A may include an image sensor 620, a lens apparatus 693 for transmitting light to the image sensor 620, and a dual prism apparatus 692 having a first prism module 692a and a second prism module 692b.

The camera 600 of FIG. 6A is similar to the camera 500a of FIG. 5A, but has a difference in that the first prism module 692a and the second prism module 692b in the dual prism apparatus 692 are differently disposed. In this case, the difference is mainly described.

In the drawing, it is illustrated that the image sensor 620, the lens apparatus 693, and the dual prism apparatus 692 are sequentially disposed, and the light incident on the dual prism apparatus 692 is transmitted to the lens apparatus 693 and the image sensor 620.

Specifically, the light from the above may be reflected by a reflection surface of the first prism PSMa in the first prism module 692a and may be transmitted to the second prism module 692b, and may be reflected by a reflection surface of the second prism PSMb in the second prism module 692b and may be transmitted to the lens apparatus 693 and the image sensor 520.

That is, unlike FIG. 5A, there is a difference in that the first prism module 692a in the dual prism apparatus 692 of FIG. 6A is disposed in a forward direction in comparison with the second prism module 692b. Accordingly, the light reflected by the prism module PSMa in the first prism module 692a may travel in the ground direction or the right direction.

That is, unlike FIG. 6A, the image sensor 620, the dual prism apparatus 692, and the lens apparatus 693 may be sequentially disposed, and the light incident on the lens apparatus 693 may be transmitted to the dual prism apparatus 692 and the image sensor 620. Hereinafter, the structure of FIG. 6A will be mainly described.

The dual prism apparatus 692 may include the first prism PSMa, the first prism module 692a having the first rotational actuator ACTa changing the angle of the first prism PSMa toward the first direction for compensating the hand tremble, the second prism PSMb, the second prism module 692b having the second rotational actuator ACTb changing the angle of the second prism toward the second direction for compensating the hand tremble.

At this time, it is preferable that the first prism PSMa and the second prism PSMb intersect with each other. In particular, it is preferable that the first prism PSMa and the second prism PSMb are disposed perpendicular to each other.

Meanwhile, the refractive indices of the first prism PSMa and the second prism PSMb may be 1.7 or more. Accordingly, a total reflection may be performed in the first prism PSMa and the second prism PSMb, and thus, the light RI can be transmitted in the direction of the image sensor.

Meanwhile, the refractive indices of the first prism PSMa and the second prism PSMb may be less than 1.7, and a reflective coating may be formed on a reflective surface of the second prism PSMb and the second substrate PSMb. Accordingly, a total reflection can be performed in the first prism PSMa and the second prism PSMb, and thus, the light RI can be transmitted in the direction of the image sensor.

According to this, the image sensor 620, the lens apparatus 693, and the first prism module 692a may be disposed side by side in one direction, while the second prism module 692b is disposed to intersect with the first prism module 692a.

Accordingly, the first prism module 692a and the second prism module 692b may be referred to as an L-type dual prism apparatus 692. In addition, the camera 500a having this structure may be referred to as an L-type camera.

According to this structure, through the first prism module 692a and the second prism module 692b, a rotation may occur in a first direction, e.g., in a counterclockwise direction ccw based on a first rotation axis Axa and a rotation may occur in a second direction, e.g., in a counterclockwise direction ccw based on a second rotation axis Axb to perform the angle compensation, thereby achieving the optical image stabilization (OIS) function.

In particular, since angular compensation is performed by using a rotary actuator, there is an advantage that it is enough to compensate only an angle within a given range, regardless of whether the optical zoom of the lens apparatus 693 is a low magnification or a high magnification. Hence, regardless of the optical zoom, the accuracy of optical image stabilization (OIS) can be improved.

In addition, since an optimal space arrangement can be accomplished in a limited space, a slim camera 600 can be implemented. Therefore, the present disclosure can be applied to the mobile terminal 100, and the like.

FIG. 6A illustrates that the length of the lens apparatus 693 is denoted by Wb and the length of the dual prism apparatus 692 is denoted by Wpb, and the heights of the lens apparatus 693 and the dual prism apparatus 692 are denoted by hb.

Since the first prism module 692a and the second prism module 692b in the dual prism apparatus 692 are disposed to intersect with each other, as shown in the mobile terminal 100b of FIG. 6B, the movement direction of the incident light RI may be changed twice through the first prism module 692a and the second prism module 692b, and the image sensor 620 can be disposed in the left side of the mobile terminal 100b. In particular, the image sensor 620 may be disposed opposite the lateral side of the mobile terminal 100b.

Therefore, the thickness DDb of the mobile terminal 100y may be determined not by the sum (Wb+Wpb) of the lengths of the lens apparatus 693 and the dual prism apparatus 692, but by the height ho of the lens apparatus 693 and the dual prism apparatus 692 or the height ho of the image sensor.

Accordingly, as the height hb of the lens apparatus 693 and the dual prism apparatus 692 or the height ho of the image sensor is designed to be low, the thickness DDb of the mobile terminal 100y can be slimly implemented. Accordingly, the slim camera 600 having a thin thickness and a mobile terminal having the slim camera 600 can be implemented.

Figure 7:
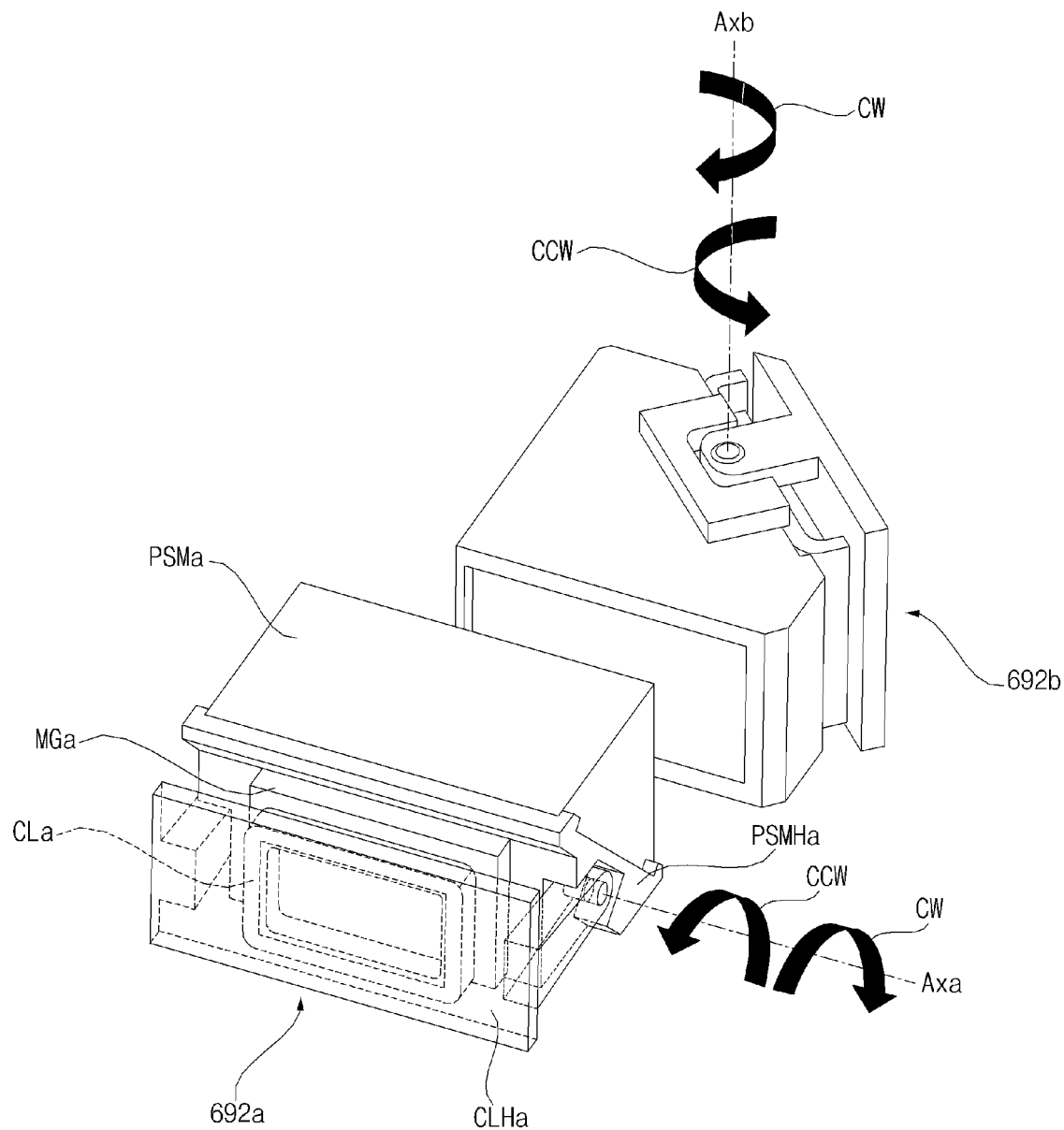
FIGS. 7-9C are referred for the explanation of the camera.
Figure 8:
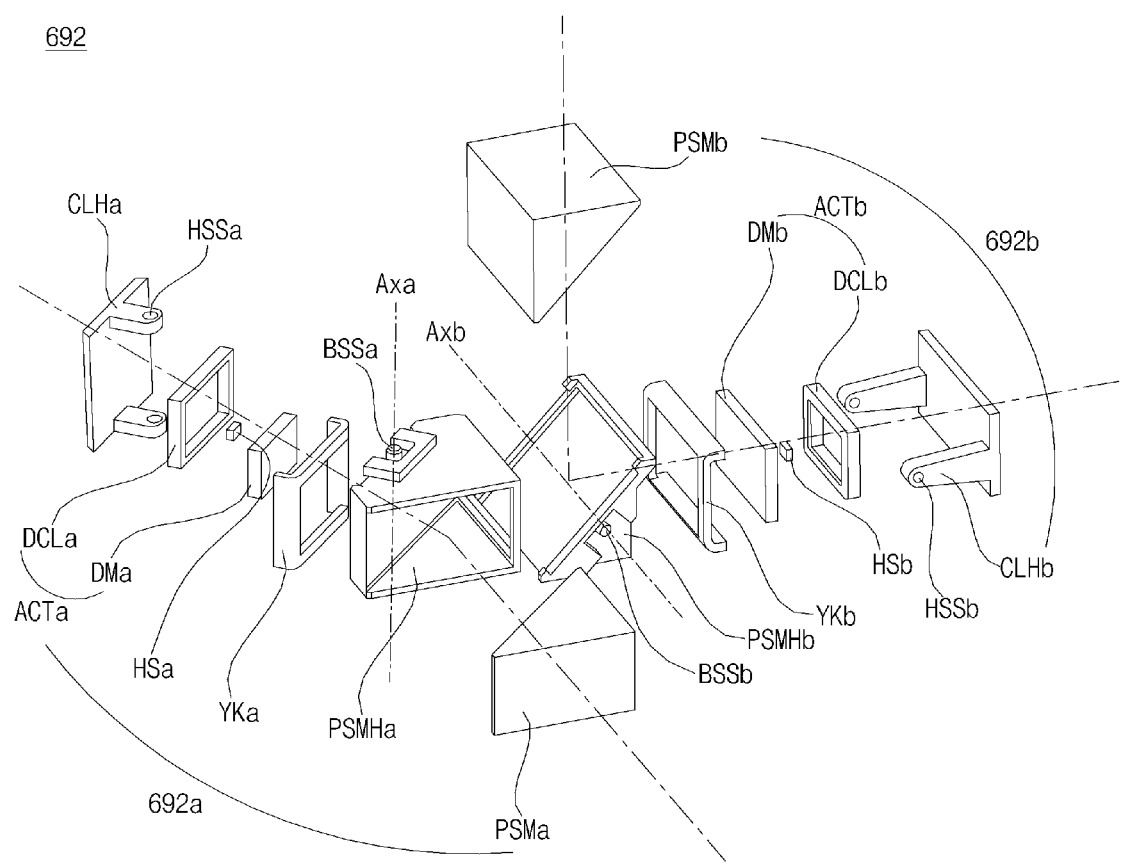

Meanwhile, referring to FIGS. 7 and 8, the dual prism apparatus 692 may include the first prism module 692a and the second prism module 692b.

The first prism module 692a may comprise the prism PSMa, a prism holder PSMHa for fixing the prism PSMa to a first surface, a yoke Yka of a first surface is attached to a second surface of the prism holder PSMHa which is opposed to a first surface thereof, a drive magnet DMa attached to a second surface of the yoke Yka which is rear surface of the first surface thereof, a coil holder CLHa, a drive coil DCLa disposed between the coil holder CLHa and the yoke Yka, the hole sensor Hsa positioned between the drive coil DCLa and the drive magnet DMa.

The coil holder CLHa may comprise a plurality of protrusions, at both ends thereof, protruding toward the prism holder PSMa, a plurality of openings HSSa formed on each of the plurality of protrusions, respectively. The coil holder CLHa may fix the drive coil DCLa.

The prism holder PSMHa may comprise a plurality of bosses BSSa protruding from both ends thereof.

The plurality of bosses BSSa on both end of the prism holder PSMHa may be coupled to the plurality of openings HSSa formed on the coil holder CLHa.

Meanwhile, the drive magnet DMa and the drive coil DCLa in the first prism module 692a may comprise a first rotary actuator ACTa.

For example, in order to compensate the first direction motion among the first direction motion and the second direction motion sensed by the motion sensor 145, particularly, the gyro sensor 145c, shown in FIG. 3C or FIG. 3D, the drive controller DRC may output the first control signal Saca to the first actuator ACTa in the first prism module 692a.

The first actuator ACTa may change the angle of the first prism PSMa based on the first rotation axis, based on the first control signal Saca.

In particular, based on the first control signal Saca applied to the drive coil DCLa in the first actuator ACTb, the angle of the first prism PSMa can be changed based on the first rotation axis.

Meanwhile, the first hall sensor HSa may sense the change of the magnetic field to sense movement information due to movement of the first prism PSMa.

In addition, the motion information, particularly, the magnetic field or change of the magnetic field information Shsa, detected by the first hall sensor HSa may be input to the drive controller DRC.

The drive controller DRC may perform a PI control or the like, based on the control signal Saca for motion compensation and the motion information, in particular, the magnetic field or change of the magnetic field information Shsa. Accordingly, the motion of the first prism PSMa can be accurately controlled.

That is, the drive controller DRC may perform a closed loop by receiving the information Shsa detected by the first hall sensor HSa, and can accurately control the motion of the first prism PSMa.

Accordingly, the drive magnet DMa, the prism holder PSMHa, and the prism PSMa may be rotated based on the first rotation axis Axa.

Meanwhile, the coil holder CLHa, the drive coil DCLa, and the hall sensor HSa may be fixed without being rotated based on the first rotation axis Axa.

As described above, some units in the first prism module 692a may rotate and some units may be fixed, thereby detecting the movement caused by hand tremble based on a magnetic field signal sensed in the hall sensor HSa. In order to perform optical image stabilization (OIS) for compensating movement of dual prism caused by hand tremble, the drive magnet DMa may rotate so that the prism PSMa or the like can be rotated. Thus, the optical image stabilization (OIS) in the first direction can be accurately performed.

Meanwhile, referring to FIG. 8, the second prism module 692b may comprise the prism PSMb, a prism holder PSMHb for fixing the prism PSMb to a first surface thereof, a yoke Ykb of a first surface is attached to a second surface of the prism holder PSMHb which is opposed to a first surface thereof, a drive magnet DMb attached to a second surface of the yoke Ykb which is rear surface of the first surface thereof, a coil holder CLHb, a drive coil DCLb disposed between the coil holder CLHb and the yoke Ykb, the hall sensor Hsb positioned between the drive coil DCLb and the drive magnet DMb.

The coil holder CLHb may comprise a plurality of protrusions, at both ends thereof, protruding toward the prism holder PSMb, a plurality of openings HSSb formed on each of the plurality of protrusions, respectively. The coil holder CLHb may fix the drive coil DCLb.

The prism holder PSMHb may comprise a plurality of bosses BSSb protruding from both ends thereof.

The plurality of bosses BSSb on both end of the prism holder PSMHb may be coupled to the plurality of openings HSSb formed on the coil holder CLHb.

Meanwhile, the drive magnet DMb and the drive coil DCLb in the second prism module 692b may comprise a second rotary actuator ACTb.

For example, in order to compensate the second direction motion among the first direction motion and the second direction motion sensed by the motion sensor 145, particularly, the gyro sensor 145c, shown in FIG. 3C or FIG. 3D, the drive controller DRC may output the second control signal Sacb to the second actuator ACTb in the second prism module 692b.

The second actuator ACTb may change the angle of the second prism PSMb based on the second rotation axis, based on the second control signal Sacb.

In particular, based on the second control signal Sacb applied to the drive coil DCLb in the second actuator ACTb, the angle of the second prism PSMb can be changed based on the second rotation axis.

Meanwhile, the first hall sensor HSb may sense the change of the magnetic field to detect movement information due to movement of the first prism PSMb.

In addition, the motion information, particularly, the magnetic field or change of the magnetic field information Shsb, detected by the second hall sensor HSb may be input to the drive controller DRC.

The drive controller DRC may perform a PI control or the like, based on the control signal Sacb for motion compensation and the motion information, in particular, the magnetic field or change of the magnetic field information Shsb. Accordingly, the motion of the second prism PSMb can be accurately controlled.

That is, the drive controller DRC may perform a closed loop by receiving the information Shsb detected by the second hall sensor HSb, and can accurately control the motion of the second prism PSMb.

Accordingly, the drive magnet DMb, the prism holder PSMHb, and the prism PSMb may be rotated based on the second rotation axis Axb.

Meanwhile, the coil holder CLHb, the drive coil DCLb, and the hall sensor HSb may be fixed without being rotated based on the second rotation axis Axb.

As described above, some units in the second prism module 692b may rotate and some units may be fixed, thereby detecting the movement caused by hand tremble based on a magnetic field signal sensed in the hall sensor HSb. In order to perform optical image stabilization (OIS) for compensating movement of dual prism caused by hand tremble, the drive magnet DMb may rotate so that the prism PSMb or the like can be rotated. Thus, the optical image stabilization (OIS) in the second direction can be accurately performed.

For example, as shown in FIG. 7, when the first prism PSMa is rotated in the clockwise direction CCW based on the first rotation axis Axa due to the hand tremble of the user, the drive controller DRC may control the first prism PSMa, a first sensor magnet SMa, and the like to rotate in the counterclockwise direction CCW based on the first rotation axis Axa, by using the rotary actuator, particularly, the first drive magnet DMa and the first drive coil DCLa so as to perform optical image stabilization (OIS) for compensating movement of dual prism caused by hand tremble.

Particularly, when the first control signal Saca from the drive controller DRC is applied to the first drive coil DCLa in the first actuator ACTa, a Lorentz force may be generated between the first drive coil DCLa and the first drive magnet DMa, so that the first drive magnet DMa can rotate in the counterclockwise direction CCW.

At this time, the first hall sensor Hsa may detect a change in the magnetic field that is variable, by the counterclockwise CCW rotation of the first sensor magnet SMa.

In addition, the drive controller DRC may perform a closed loop based on the information Shsa detected by the first hall sensor HSa, so that the counterclockwise CCW rotation of the first drive magnet DMa can be more accurately controlled.

For another example, as shown in FIG. 7, when the second prism PSMb is rotated in the clockwise direction CCW based on the second rotation axis Axb due to the hand tremble of the user, the drive controller DRC may control the second prism PSMb, a second sensor magnet SMb, and the like to rotate in the counterclockwise direction CCW based on the second rotation axis Axb, by using a second rotary actuator, particularly, the second drive magnet DMb and the second drive coil DCLb so as to perform optical image stabilization (OIS) for compensating movement of dual prism caused by hand tremble.

Particularly, when the second control signal Sacb from the drive controller DRC is applied to the second drive coil DCLb in the second actuator ACTb, a Lorentz force may be generated between the second drive coil DCLb and the second drive magnet DMb, so that the second drive magnet DMb can rotate in the counterclockwise direction CCW.

At this time, the second hall sensor Hsb may detect a change in the magnetic field that is variable, by the counterclockwise CCW rotation of the first sensor magnet SMa.

In addition, the drive controller DRC may perform a closed loop based on the information Shsa detected by the second hall sensor HSa, so that the counterclockwise CCW rotation of the first drive magnet DMa can be more accurately controlled.

As described above, the first prism module 692a and the second prism module 692b may be independently driven respectively, based on the first rotation axis Axa and the second rotation axis Axb, depending on the hand tremor movement. Therefore, the optical image stabilization (OIS) for a plurality of directions can be performed quickly and accurately.

Meanwhile, when the first prism PSMa moves at a first angle of a first direction of the first rotation axis Axa, the first actuator ACTa may change the first prism PSMa into a second angle θ2 which is half of the first angle θ1, in a second direction opposite to the first direction of the first rotation axis Axa. According to this, motion compensation may be performed at an angle less than the motion of the user's hand tremble in spite of the motion of the user's hand tremble, so that accurate optical image stabilization (OIS) can be performed. In addition, the power consumption can also be reduced.

Meanwhile, when the second prism PSMb moves at a third angle θ3 in a third direction of the second rotation axis Axb, the second actuator ACTb may change the second prism PSMb into a fourth angle θ4 which is half the third angle θ3, in a fourth direction opposite to the third direction of the second rotation axis Axb. According to this, motion compensation may be performed at an angle less than the motion of the user's hand tremble in spite of the motion of the user's hand tremble, so that accurate optical image stabilization (OIS) can be performed. In addition, the power consumption can also be reduced. This will be described with reference to FIGS. 9A to 9C below.

Figure 9A:
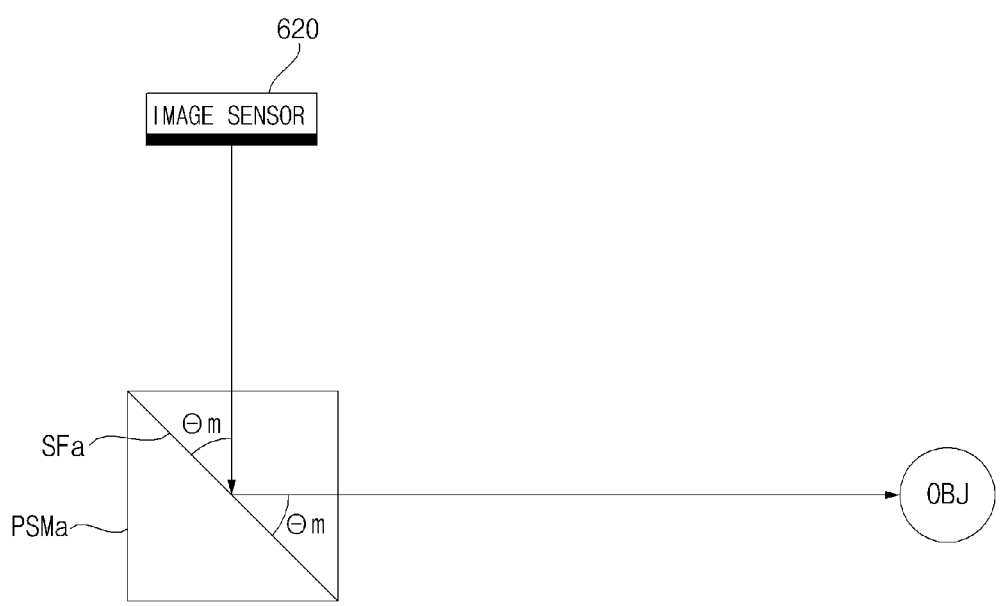
Figure 9B:
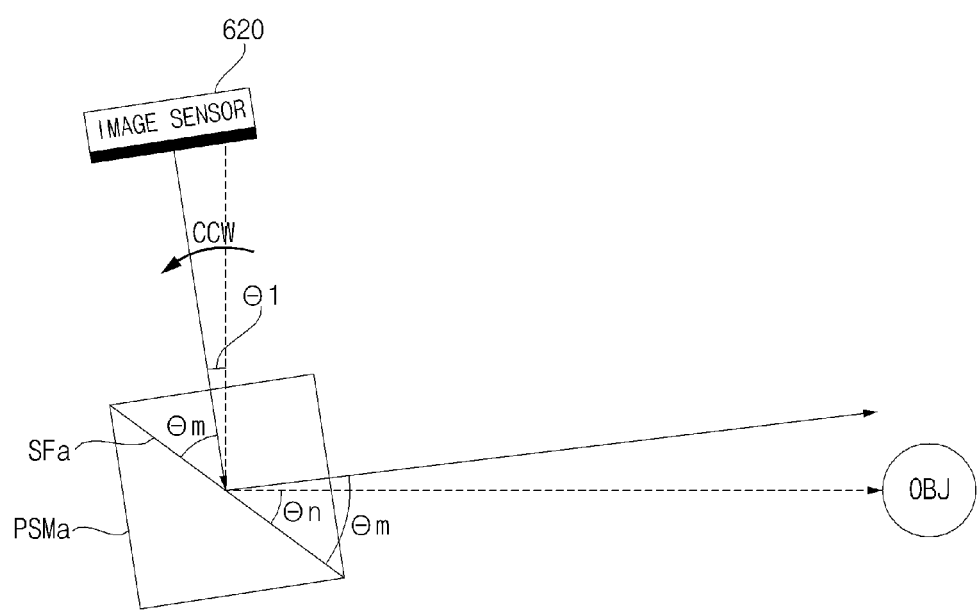
Figure 9C:
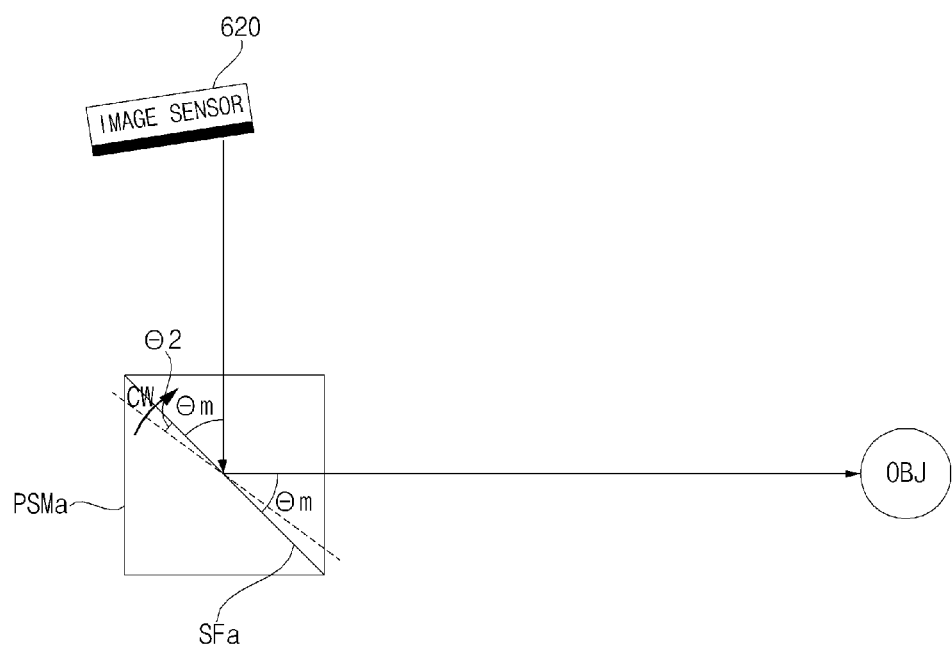

FIGS. 9A to 9C are diagrams for explaining the hand tremble motion and the optical image stabilization (OIS) according to the hand tremble motion.

Hereinafter, for convenience of explanation, the image sensor 620, the first prism PSMa, and a front object OBL will be described.

Firstly, FIG. 9A illustrates that the first prism PSMa disposed between the front object OBL and the image sensor 620 is fixed, when there is no hand tremble motion of the user.

Referring to FIG. 9A, the image sensor 620 and the reflection surface SFa of the first prism PSMa may comprise an angle θm, and the angle between the reflection surface SFa of the first prism PSMa and the front object OBL may be the same angle θm. Here, the angle θm may be approximately 45 degrees.

According to this, the image sensor 620 may capture a light for the front object OBL, through the light which is reflected and inputted by the reflection surface SFa of the first prism PSMa, and convert the captured light into an electric signal. Therefore, image conversion for the front object OBL can be achieved.

Next, FIG. 9B illustrates that the first prism PSMa disposed between the front object OBL and the image sensor 620 rotates in the counterclockwise direction CCW by the first angle θ1, when the hand tremble of the user is generated in the counterclockwise direction CCW by the first angle θ1.

Referring to FIG. 9B, the image sensor 620 and the reflection surface SFa of the rotated first prism PSMa may comprise an angle θm, but the angle between the reflection surface SFa of the rotated first prism PSMa and the front object OBL may be θn less than the angle θm.

In other words, the image sensor 620 and the reflection surface SFa of the rotated first prism PSMa have an angle θm, and the front object OBL does not exist in the direction of the angle θm from the reflection surface SFa of the rotated first prism PSMa.

Therefore, the image sensor 620 cannot capture the light for the front object OBL, through the light which is reflected and inputted by the reflection surface SFa of the first prism PSMa.

Thus, the first actuator ACTa may rotate the first prism PSMa at the second angle θ2 which is half the first angle θ1, in the clockwise direction CW.

FIG. 9C illustrates that the first prism PSMa is rotated by the second angle θ2 which is half the first angle θ1 in the clockwise direction CW, in order to perform optical image stabilization (OIS) for compensating movement of dual prism caused by hand tremble of the user.

Accordingly, like FIG. 9A, the image sensor 620 and the reflection surface SFa of the rotated first prism PSMa may comprise an angle θm, and the angle between the reflection surface SFa of the rotated first prism PSMa and the front object OBL may be θm.

According to this, the image sensor 620 may capture the light for the front object OBL, through the light reflected and inputted by the reflection surface SFa of the first prism PSMa, and convert the light into an electric signal. Therefore, in spite of the hand tremble, the image conversion for the front object OBL can be stably achieved through the optical image stabilization (OIS).

Figure 10:
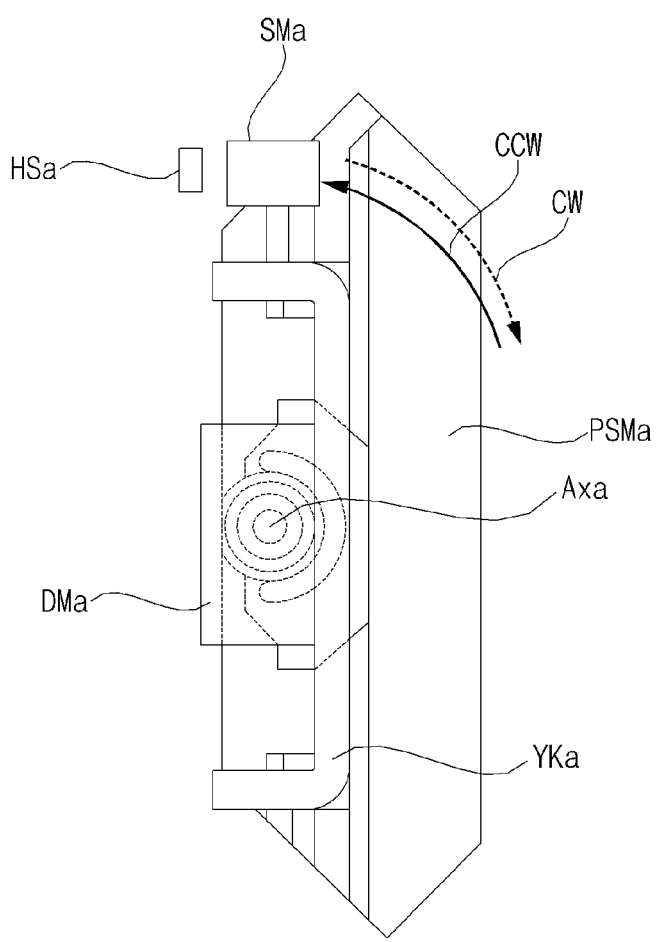
FIG. 10 is referred for the explanation of the prism apparatus.

FIG. 10 is a drawing referred for explaining the prism apparatus.

Referring the figure, like a prism apparatus 692x, a prism PSMax may be disposed on a first surface of the prism holder PSMHax, a yoke YKax may be disposed on a second surface of the prism holder PSMHax which is rear surface of the first surface thereof, a sensor magnet SMax may be disposed above the yoke Ykax with the rotation axis Axa laid up and down direction of the ground, a hall sensor Hsax may be spaced apart from the sensor magnet SMax.

Meanwhile, when the prism PSMax rotates clockwise about the rotation axis Axa by hand tremble, the drive controller DRC, for compensating hand tremble, may control the prism PSMax and the sensor magnet Smax, etc. to rotate counterclockwise about the rotation axis Axa by using the rotary actuator, especially the drive coil and the drive magnet DMax.

In this case, the hall sensor Hsax may sense the change of variable magnetic field by the counterclockwise rotation of the sensor magnet SMax.

Meanwhile, a width of the sensor magnet SMax may be W1, like the drawing.

However, since the change or the intensity of magnetic field induced only by the sensor magnet SMax is weak, the accuracy of sensing the change or intensity of magnetic field becomes lower. And the accuracy of compensation for the angle caused by the counterclockwise rotation may become lower.

Accordingly, in the present disclosure, a method of increasing the sensing accuracy on the change or intensity of magnetic field in hall sensor will be proposed. For this, referring to FIG. 11 to 14, it will be described.

Figure 11:
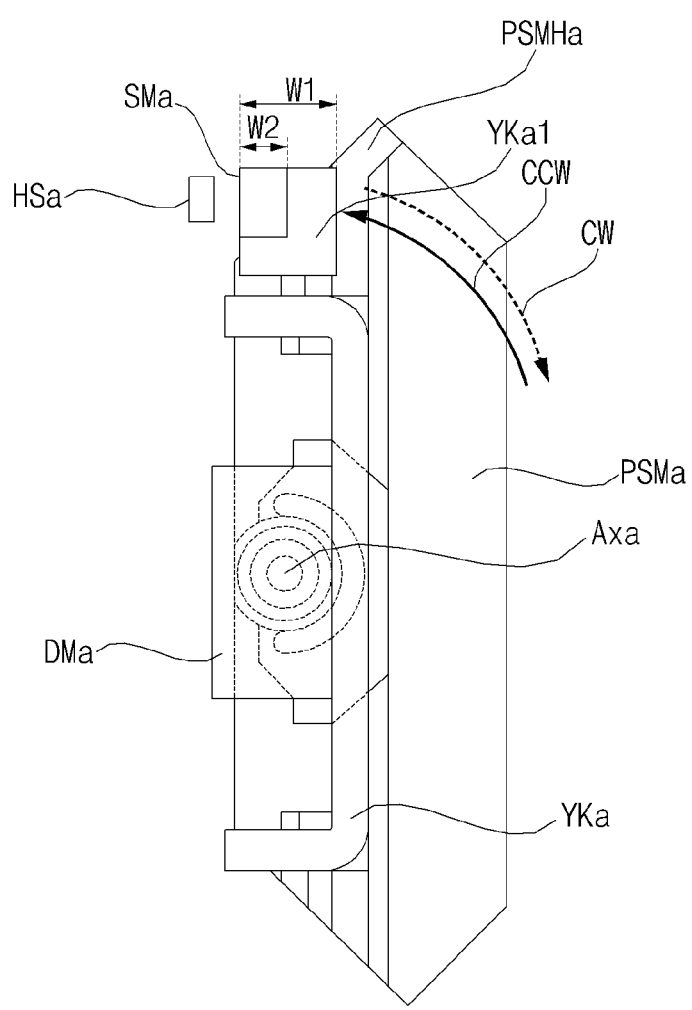
FIG. 11 is a drawing showing the prism apparatus according to the embodiment of the present disclosure.

FIG. 11 is a drawing showing the prism apparatus according to the embodiment of the present disclosure. FIG. 12A to FIG. 14 are referred for the explanation of FIG. 11.

According to the prism apparatus 692a of FIG. 11, the prism PSMa is disposed on the first surface of the prism holder PSMHa, the yoke Yka is disposed on the second surface of the prism holder PSMHa which is rear surface of the first surface thereof. Especially, the first surface of the yoke Yka may be disposed on the second surface of the prism holder PSMHa.

Meanwhile, with the rotation axis AXa laid up and down direction of the ground, the sensor magnet SMa may be disposed above the yoke Yka and the hall sensor Hsaz may be spaced apart from the sensor magnet SMa.

Meanwhile, the drive magnet DMa may be attached to the second surface of the yoke Yka which is rear surface of the first surface thereof.

In this case, as described above with the FIGS. 7 and 8, when the first prism PSMa rotates about the first rotation axis Axa in a first clockwise direction by user's hand tremble, the drive controller may control the first prism PSMa, the first sensor magnet SMa and etc. by using the first rotation actuator, especially, the first drive magnet DMa and the first drive coil to rotate counterclockwise CCW, for compensating the user's hand tremble, about the first rotational axis Axa.

Particularly, when the first control signal Saca from the drive controller DRC is applied to the first drive coil DCLa inside the first actuator ACTa, a Lorentz force may be generated between the first drive coil DCLa and the first drive magnet DMa, so that the first drive magnet DMa can rotate in the counterclockwise direction CCW.

At this time, the first hall sensor Hsa may sense a change in the magnetic field that is variable, by the counterclockwise CCW rotation of the first sensor magnet SMa.

However, since the change or intensity of magnetic field induced only by the sensor magnet SMa is weak, in the present disclosure, the prism apparatus 692a may include a sensor magnet supporter Yka1 to which the sensor magnet is attached.

Especially, it is preferable that the sensor magnet supporter Yka1 is disposed above the yoke Yka.

In this case, it is preferable that the sensor magnet supporter Yka1 is made of magnetic shielding material capable of shielding the magnetic field in direction opposite to the hall sensor Hsa, not in direction to the hall sensor Hsa.

For example, the sensor magnet supporter Yka1 may be a steel plate (Steel Plate Cold Commercia, SPCC), ferrite, or the like.

Also, it is preferable that the sensor magnet supporter Yka1 is a material capable of enhancing the intensity of the magnetic field in the direction to the hall sensor Hsa.

In the FIG. 11, the first surface (left surface) and the second surface (upper surface) of the sensor magnet Sma which is disposed the sensor magnet supporter Yka1 are exposed to outside.

Specifically, in FIG. 11, a lower surface and a right surface of the sensor magnet Sma are not exposed to the outside by contacting the sensor magnet supporter Yka1.

And only the left surface and the upper surface of the sensor magnet Sma are exposed to the outside.

According to this, magnetic field of the sensor magnet Sma in the right and downward direction is shielded. Accordingly, the magnetic field of the sensor magnet Sma in the left and upward direction becomes strong.

Meanwhile, according to the FIG. 11, since the intensity of magnetic field around the hall sensor Hsa become stronger, with compared to FIG. 10, by the sensor magnet supporter Yka1. Accordingly, the accuracy of angle compensation may be improved.

Meanwhile, when the range of the rotation angle of the clockwise direction CW due to the hand tremble is approximately between 10 degrees and −10 degrees, the angle compensation range by the rotation in the counterclockwise direction CCW may be approximately between 5 degrees and −5 degrees which is half of the range of the rotation angle of the clockwise direction CW due to the hand tremble.

Meanwhile, in the FIG. 11, though the hand tremble is small and then the clockwise CW rotation angle decreases, the hall sensor Hsa may accurately detect it, and as a result, the accuracy of angle compensation for the counterclockwise rotation CCW may be improved.

Meanwhile, by the sensor magnet supporter Yka1, a width W2 or a size of the sensor magnet Sma in the FIG. 11 may be designed to be less than a width W1 or a size of the sensor magnet Smax in FIG. 10.

In the figures, the width W2 of the sensor magnet Sma in FIG. 11 is about a half of the width W1 of the sensor magnet Smax in FIG. 10. For example, the width W2 of the sensor magnet Sma of FIG. 11 may be half of the width W1 of the sensor magnet Smax and the sensor magnet supporter Yka1. Accordingly, the manufacturing cost of the sensor magnet Sma may be reduced.

Figure 12A:
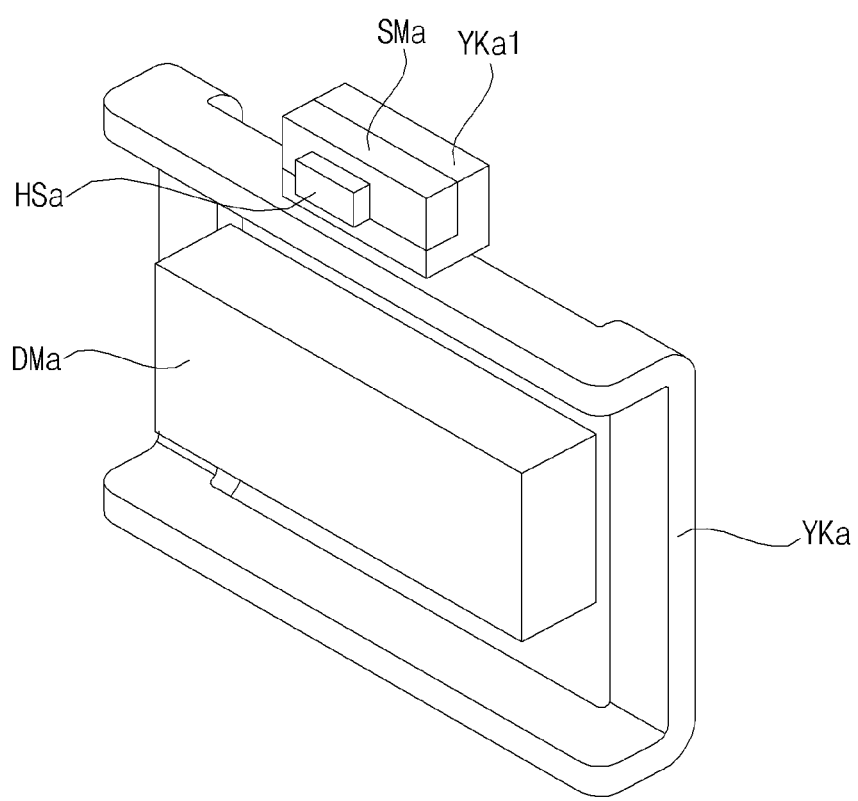
FIGS. 12A-14 are referred for the explanation of FIG. 11.
Figure 12B:
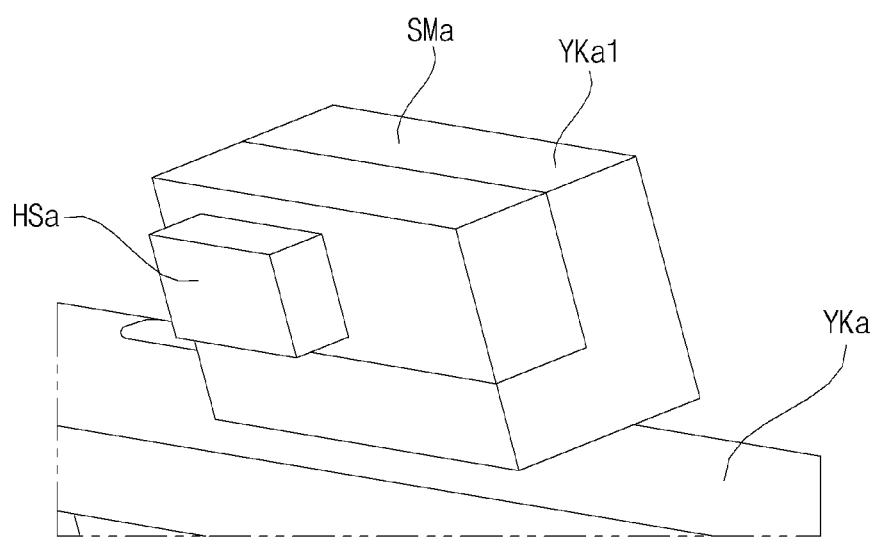

FIG. 12A and FIG. 12B illustrate top view and enlarged view of the sensor magnet supporter Yka1, the sensor magnet Sma, the hall sensor Hsa in FIG. 11.

Figure 12C:
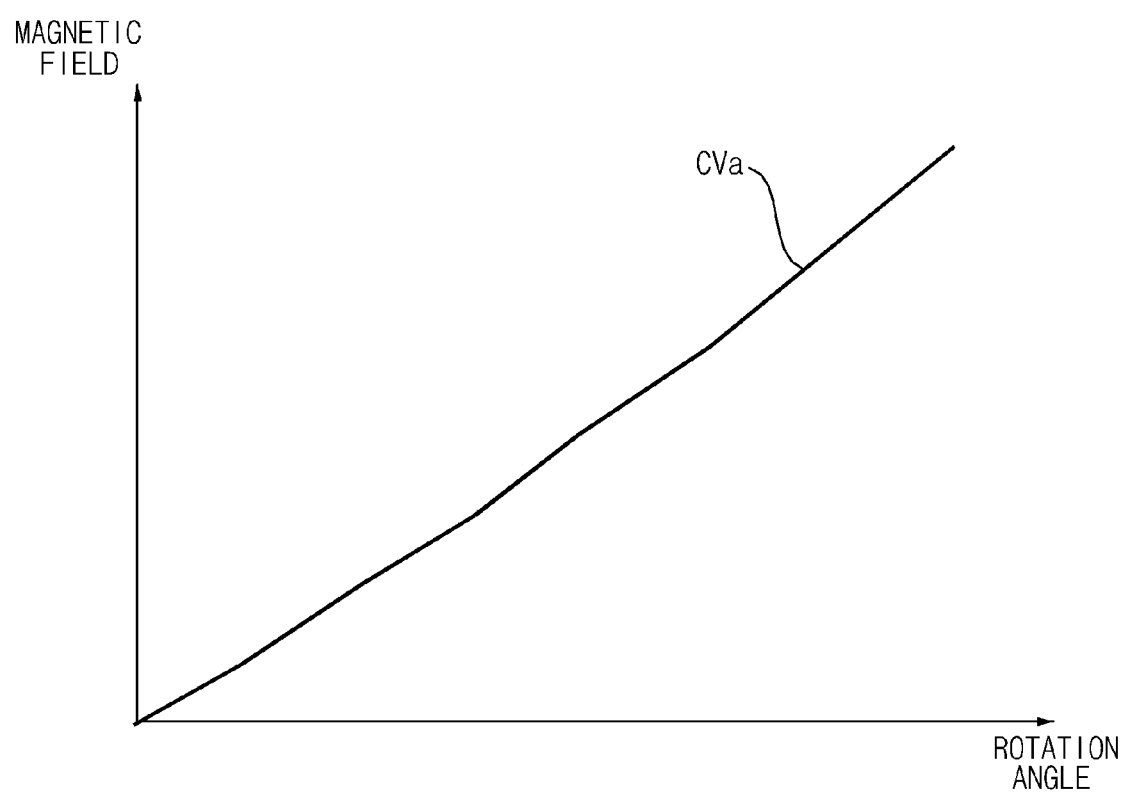
Figure 12D:
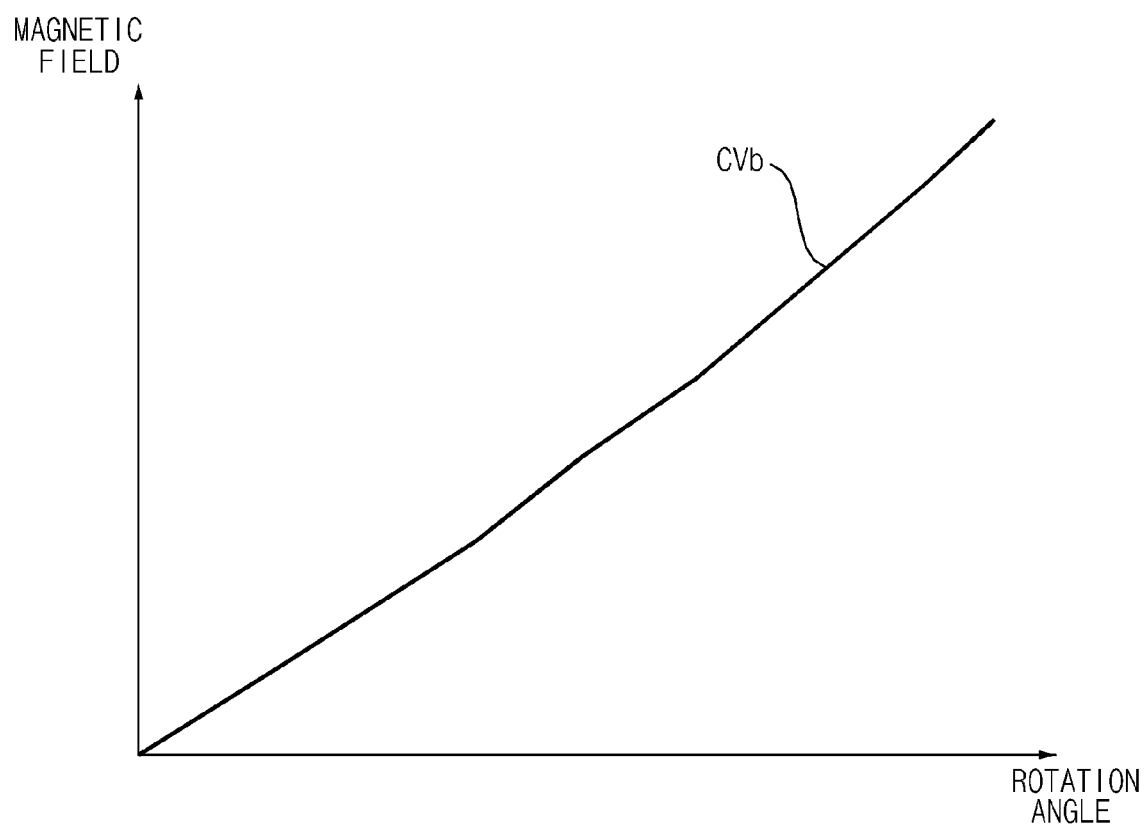

The intensity curve of magnetic field according to the structures of FIG. 10 and FIG. 11 may be illustrated as shown in FIG. 12C and FIG. 12D.

According to the intensity curve CVa of magnetic field in the FIG. 12C, corresponding to FIG. 10, when the prism PSMa rotates through a certain angle (For example, 1 degree), the change in intensity of magnetic field may be 50 T. That is, the slope of the intensity curve CVa of magnetic field in the FIG. 12C may be 50 T.

Meanwhile, according to the intensity curve CVb of FIG. 12D, corresponding to FIG. 11, when the prism PSMb rotates through a certain angle (For example, 1 degree), the change in intensity of magnetic field may be 70 T. That is, the slope of the intensity curve CVb in FIG. 12D may be 70 T. Accordingly, compared to FIG. 10, a change in intensity of magnetic field of 40% may be achieved.

Eventually, according to the prism apparatus 692a of FIG. 11, the accuracy of detecting the change or intensity of magnetic field of the hall sensor Hsa may be improved.

FIG. 13A to FIG. 13D are figures illustrating a variety of examples of the prism apparatus according to the embodiment of present disclosure.

Figure 13A:
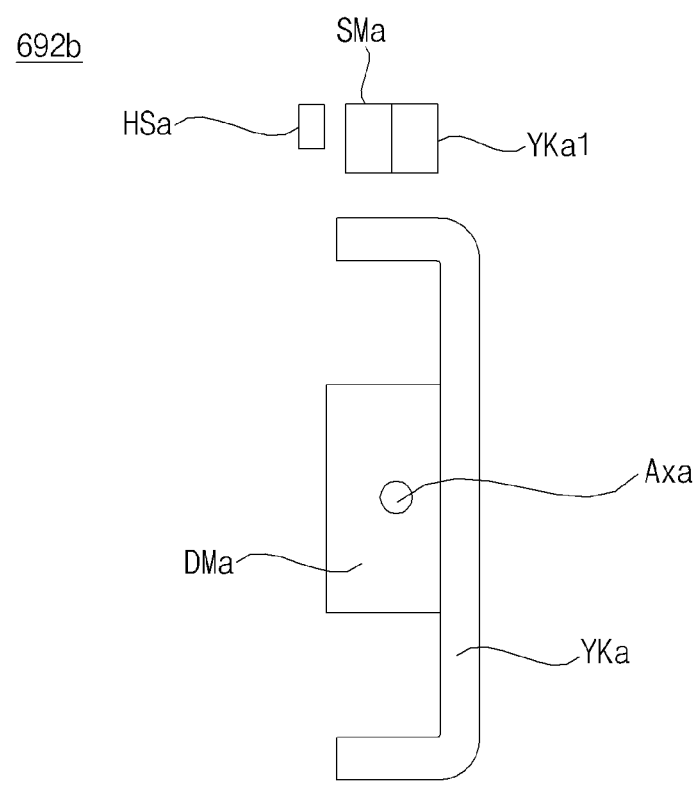

First, the FIG. 13A shows that the first surface (left surface), the second surface (upper surface) and the third surface (lower surface) of the sensor magnet Sma, disposed at the sensor magnet supporter Yka1 in the prism apparatus 692b, is exposed to the outside.

Specifically, the right surface of the sensor magnet Sma is not exposed to the outside by contacting the sensor magnet supporter Yka1. And the left, upper, lower surface of the sensor magnet Sma are exposed to the outside.

According to this, since the magnetic field exerted to the right of the sensor magnet Sma is shielded and then the magnetic field exerted to the left, upward, downward is enhanced, the intensity of magnetic field around the hall sensor Hsa becomes strong.

Figure 13B:
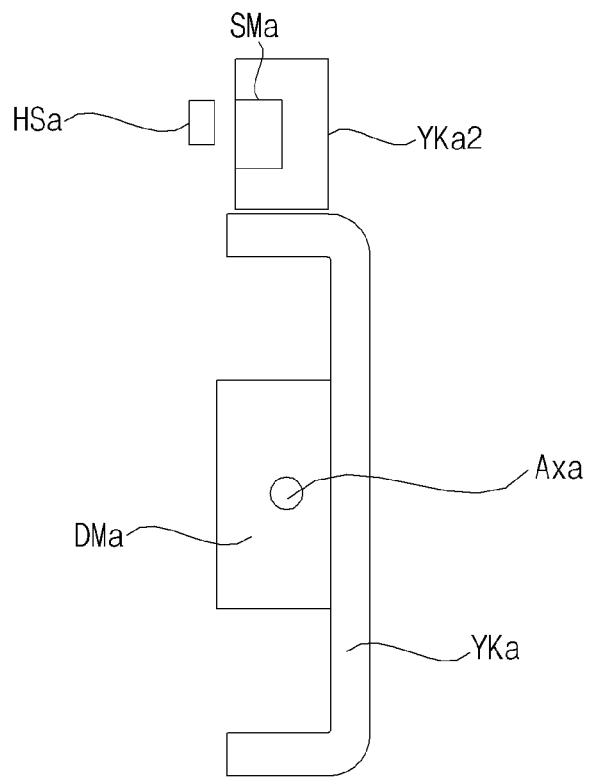

Next, FIG. 13B shows the first surface (left surface) of the sensor magnet Sma, disposed at a sensor magnet supporter Yka2 in a prism apparatus 692c, is exposed to the outside.

Specifically, the right, upper, lower surface of the sensor magnet Sma are not exposed to the outside by contacting the sensor magnet supporter Yka2. And the left surface of the sensor magnet Sma is exposed to the outside.

According to this, the magnetic field exerted to the right, upward, downward of the sensor magnet Sma is shielded. And the magnetic field exerted to the left of the sensor magnet Sma becomes strong. Eventually the intensity of magnetic field around the hall sensor Hsa becomes strong.

Meanwhile, as shown in FIG. 13B, when the sensor magnet supporter Yka2 contacts the yoke Yka, the sensor magnet supporter Yka2 and the yoke Yka may be formed of same material. Accordingly, since the sensor magnet supporter Yka2 and the yoke Yka may be formed simultaneously, manufacturing may be simplified.

Also, since the sensor magnet supporter Yka2 contacts with the yoke Yka, the magnetic shielding effect, by the sensor magnet supporter Yka2, may be improved further.

Figure 13C:
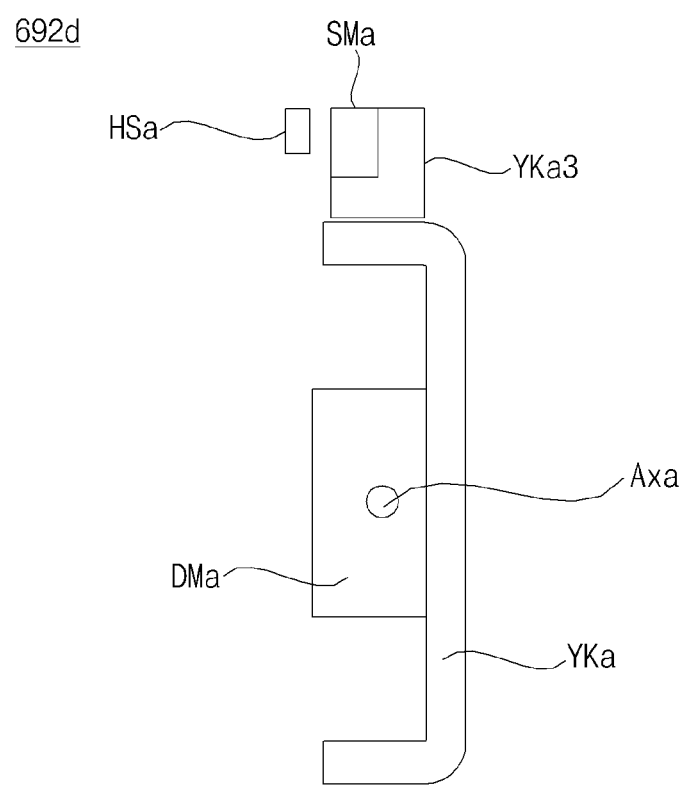

Next, FIG. 13C shows that the first surface (left surface) of the sensor magnet Sma, disposed at a sensor magnet supporter Yka3 in a prism apparatus 692d, is exposed to the outside.

Specifically, the right, lower surface of the sensor magnet Sma is not exposed to the outside by contacting with the sensor magnet supporter Yka3. And the left and upper surface of the sensor magnet Sma are exposed to the outside.

According to this, the magnetic field exerted to the right and downward, downward of the sensor magnet Sma is shielded. And the magnetic field exerted to the left and upward of the sensor magnet Sma becomes strong. Eventually the intensity of magnetic field around the hall sensor Hsa becomes strong.

Meanwhile, as shown in FIG. 13B, when the sensor magnet supporter Yka3 contacts the yoke Yka, the sensor magnet supporter Yka3 and the yoke Yka may be formed of same material. Accordingly, since the sensor magnet supporter Yka3 and the yoke Yka may be formed simultaneously, manufacturing may be simplified.

Also, since the sensor magnet supporter Yka3 contacts with the yoke Yka, the magnetic shielding effect, by the sensor magnet supporter Yka3, may be improved further.

Figure 13D:
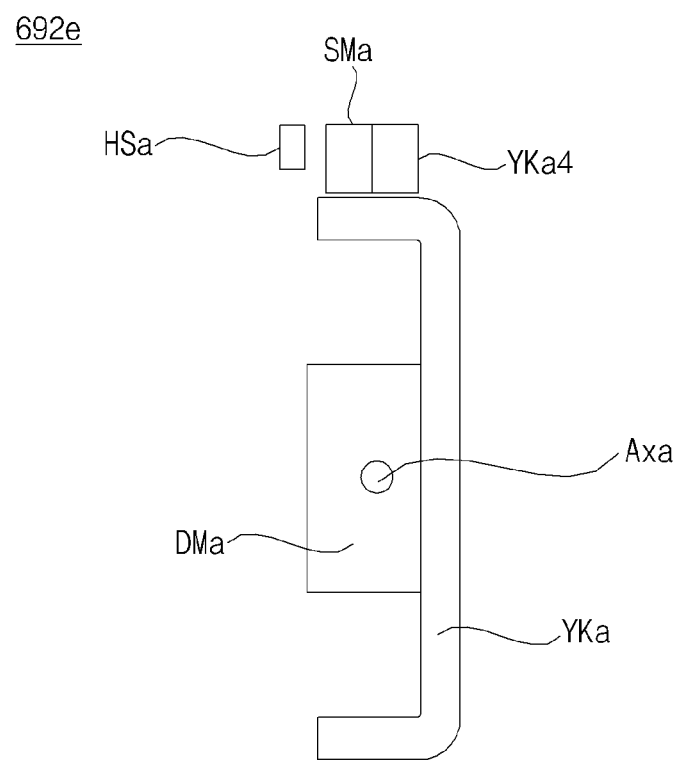

Next, in a prism apparatus 692e of FIG. 13D, similar to the prism apparatus 692b in FIG. 13A, the right surface of the sensor magnet Sma may not be exposed to the outside by contacting a sensor magnet supporter Yka4.

Meanwhile, unlike FIG. 13A, in the prism apparatus 692e of FIG. 13D, the sensor magnet supporter may contact (not spaced) the yoke Yka. Accordingly, the lower surface of the sensor magnet Sma may not be exposed to the outside by contacting with the yoke Yka.

Eventually, the first surface (left surface) and the second surface (upper surface) may be exposed to the outside.

According to this, the magnetic field exerted to the right and downward of the sensor magnet Sma is shielded and then the magnetic field exerted to upward and left becomes strong. Eventually, the magnetic field around the hall sensor Hsa becomes strong.

Meanwhile, as shown in FIG. 13B, when the sensor magnet supporter Yka4 contacts the yoke Yka, the sensor magnet supporter Yka4 and the yoke Yka may be formed of same material. Accordingly, since the sensor magnet supporter Yka4 and the yoke Yka may be formed simultaneously, manufacturing may be simplified.

Also, since the sensor magnet supporter Yka4 contacts with the yoke Yka, the magnetic shielding effect, by the sensor magnet supporter Yka4, may be improved further.

Figure 14:
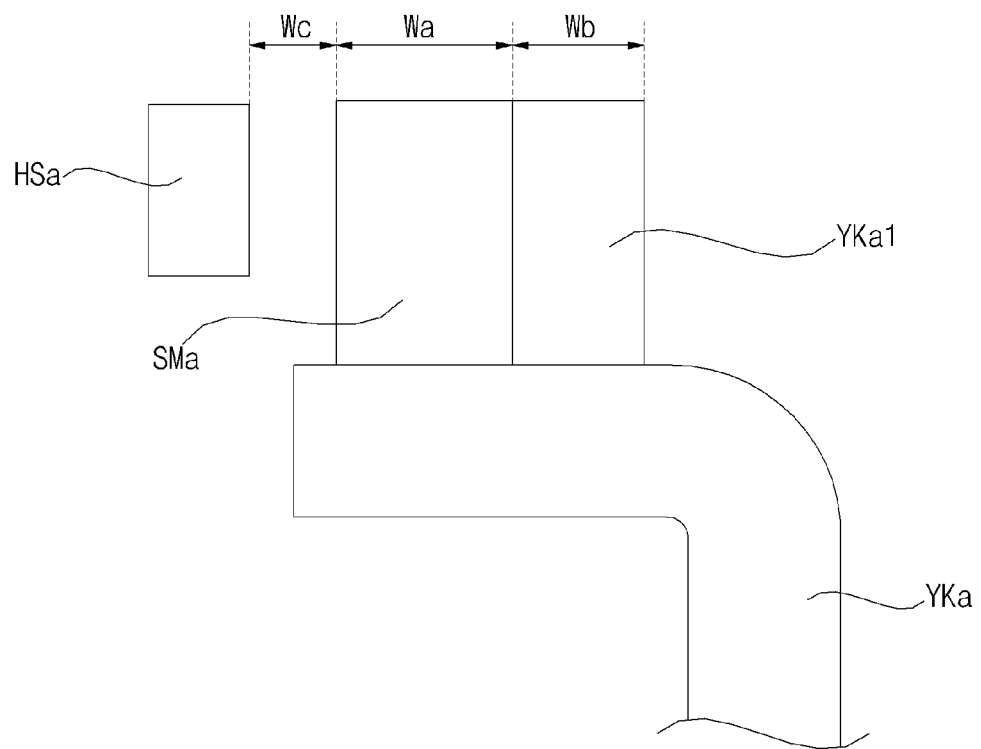

FIG. 14 is referred to explain the sensor magnet Sma and the sensor magnet supporter Yka1 in the prism apparatus 692e of FIG. 13D.

Referring to the FIG, a distance We between the sensor magnet Sma and the hall sensor Hsa is preferably less than the width Wa of the sensor magnet Sma.

As the distance We between the sensor magnet Sma and the hall sensor Hsa decreases, the intensity of the magnetic field around the hall sensor Hsa increases. Meanwhile, as the width Wa of the sensor magnet Sma increases, the intensity of the magnetic field around the hall sensor Hsa increases.

Next, the width Wa of the sensor magnet Sma is preferably greater than the width Wb of the sensor magnet supporter Yka1.

Since the sensor magnet supporting member Yka1 is for shielding the magnetic field, the width Wb of the sensor magnet supporter Yka1 is preferably less than the width Wa of the sensor magnet Sma.

Accordingly, the magnetic field in the right direction and the lower direction of the sensor magnet Sma is shielded, and the intensity of the magnetic field around the hall sensor Hsa increases.

Meanwhile, the ratio of the distance between the sensor magnet Sma and the hall sensor Has, the width Wa of the sensor magnet Sma, and the width Wb of the sensor magnet supporter Yka1 may be 1:2:0.5.

That is, the ratio of the distance between the sensor magnet Sma and the hall sensor Has, the width Wa of the sensor magnet Sma, and the width Wb of the sensor magnet supporter Yka1 may be from 1:2:0.5 to 1:2:2. Accordingly, the intensity of magnetic field around the hall sensor Hsa increases, and the sensing accuracy thereof may be improved. In addition, the sensor magnet (Sma) can be downsized, and manufacturing cost may be reduced.

Meanwhile, the description of FIGS. 11 to 14 has been described with reference to the first prism module 692a of FIGS. 6 to 8 and is applicable to the first prism module 692a. However, the description of FIGS. 11 to 14 is not limited to the first prism module 692a and is applicable to the second prism module 692b.

The dual prism apparatus 692 having the first prism module 692a and the second prism module 692b, described with FIGS. 6-14, may be used to a variety of electronic apparatus. For example, the mobile terminal 100 of FIG. 2, a vehicle, a TV, a drone, a robot, and a robot vacuum cleaner and etc.

The prism apparatus according to one embodiment of the present disclosure comprises a prism holder for fixing a prism to a first surface, a yoke of which a first surface is attached to a second surface of the prism holder which is rear surface of the first surface of the prism holder, a drive magnet attached to a second surface of the yoke which is rear surface of the first surface of the yoke, a sensor magnet disposed above the yoke, a hall sensor spaced apart from the sensor magnet and a sensor magnet supporter to which the sensor magnet is attached. Accordingly, the magnetic field may be detected accurately.

Meanwhile, wherein the sensor magnet supporter and the yoke contact with each other. Accordingly, the magnetic field may be detected accurately.

Meanwhile, wherein the sensor magnet is disposed at the sensor magnet supporter, wherein a first surface of the sensor magnet is exposed to an outside. Accordingly, the magnetic field may be detected accurately.

Meanwhile, wherein the sensor magnet is disposed at the sensor magnet supporter, wherein a first surface and a second surface of the sensor magnet is exposed to an outside. Accordingly, the magnetic field may be detected accurately.

Meanwhile, wherein the sensor magnet supporter and the sensor magnet are contacted with the yoke. Accordingly, the magnetic field may be detected accurately.

Meanwhile, wherein a distance between the sensor magnet and the hall sensor is preferably less than a width of the sensor magnet. Accordingly, the magnetic field may be detected accurately.

Meanwhile, wherein a width of the sensor magnet is preferably greater than a width of the sensor magnet supporter. Accordingly, the magnetic field may be detected accurately.

Meanwhile, by the sensor magnet supporter, the size or a width of the sensor magnet may be designed to be downsized with compared to the prior disclosures. So, manufacturing cost of the sensor magnet may be reduced.

A camera apparatus and an image display apparatus according to one embodiment of the present disclosure includes a gyro sensor sensing a motion, a prism apparatus changing the angle of a light, input to compensate the motion sensed by the gyro sensor, about a first axis and a second axis and then outputting the changed light, a lens apparatus having a plurality of lenses and realizing variable focus by moving at least one of the lenses and outputting the light from the prism apparatus by using the moving lens and an image sensor converting the light from the lens apparatus to an electric signal, wherein the prism apparatus comprises a first prism module including a first prism and changing the angle of the first prism to compensate for hand tremble in a first direction, a second prism module including a second prism and changing the angle of the second prism to compensate for hand tremble in a second direction, wherein at least one of the first prism module and the second prism module includes the sensor magnet supporter to which the sensor magnet is attached. Accordingly, detects accurately the magnetic field to compensate hand tremble and then realizes the function compensating the hand tremble.

Also, since the optical path by the first prism module is different with the second prism module, it is possible to realize the L-type camera. Accordingly, it is possible to realize the slim camera.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A prism apparatus comprising:
a prism holder for fixing a prism to a first surface;
a yoke of which a first surface is attached to a second surface of the prism holder which is rear surface of the first surface of the prism holder;
a drive magnet attached to a second surface of the yoke which is rear surface of the first surface of the yoke;

a sensor magnet disposed above the yoke;
a hall sensor spaced apart from the sensor magnet; and
a sensor magnet supporter to which the sensor magnet is attached.

2. The prism apparatus according to claim 1,
wherein the sensor magnet supporter and the yoke contact with each other.

3. The prism apparatus according to claim 1,
wherein the sensor magnet is disposed at the sensor magnet supporter,
wherein a first surface of the sensor magnet is exposed to an outside.

4. The prism apparatus according to claim 1,
wherein the sensor magnet is disposed at the sensor magnet supporter,
wherein a first surface and a second surface of the sensor magnet are exposed to an outside.

5. The prism apparatus according to claim 4,
wherein the sensor magnet supporter and the sensor magnet are contacted with the yoke.

6. The prism apparatus according to claim 1,
wherein a distance between the sensor magnet and the hall sensor is less than a width of the sensor magnet.

7. The prism apparatus according to claim 1,
wherein a width of the sensor magnet is greater than a width of the sensor magnet supporter.

8. The prism apparatus according to claim 1,
wherein a ratio of the distance between the sensor magnet and the hall sensor, a width of the sensor magnet, and a width of the sensor magnet supporter is from 1:2:0.5 to 1:2:2.

9. The prism apparatus according to claim 1 further comprising:
a coil holder; and
a drive coil disposed between the coil holder and the yoke.

10. The prism apparatus according to claim 9,
wherein openings formed on protrusions at both ends of the coil holder is coupled with bosses formed at both ends of the prism holder.

11. The prism apparatus according to claim 9,
wherein the prism rotates about a first rotation axis when a control signal for compensating a movement in a first direction is transmitted to the drive coil.

12. A camera apparatus comprising:
a gyro sensor sensing a motion;
a prism apparatus for changing the angle of a light input to compensate the motion sensed by the gyro sensor about a first axis and a second axis and outputting the changed light;
a lens apparatus including a plurality of lenses and for realizing variable focus by moving at least one of the lenses and outputting the light from the prism apparatus by using the moving lens; and
an image sensor for converting the light from the lens apparatus to an electric signal,
wherein the prism apparatus comprises:
a prism holder for fixing a prism to a first surface;
a yoke of which a first surface is attached to a second surface of the prism holder which is rear surface of the first surface of the prism holder;
a drive magnet attached to a second surface of the yoke which is rear surface of the first surface of the yoke;
a sensor magnet disposed above the yoke;
a hall sensor spaced apart from the sensor magnet; and
a sensor magnet supporter to which the sensor magnet is attached.

13. The camera apparatus according to claim 12,
wherein a distance between the sensor magnet and the hall sensor is less than a width of the sensor magnet.

14. The camera apparatus according to claim 12,
wherein a width of the sensor magnet is greater than a width of the sensor magnet supporter.

15. The camera apparatus according to claim 12,
wherein a ratio of the distance between the sensor magnet and the hall sensor, a width of the sensor magnet, and a width of the sensor magnet supporter is from 1:2:0.5 to 1:2:2.

16. A camera apparatus comprising:
a gyro sensor sensing a motion;
a prism apparatus for changing the angle of a light input to compensate the motion sensed by the gyro sensor about a first axis and a second axis and outputting the changed light;
a lens apparatus including a plurality of lenses and for realizing variable focus by moving at least one of the lenses and outputting the light from the prism apparatus by using the moving lens; and
an image sensor for converting the light from the lens apparatus to an electric signal,
wherein the prism apparatus comprises:
a first prism module including a first prism and changing the angle of the first prism to compensate for hand tremble in a first direction;
a second prism module including a second prism and changing the angle of the second prism to compensate for hand tremble in a second direction;
wherein at least one of the first prism module and the second prism module includes a prism apparatus
wherein the prism apparatus comprises:
a prism holder for fixing a prism to a first surface;
a yoke of which a first surface is attached to a second surface of the prism holder which is rear surface of the first surface of the prism holder;
a drive magnet attached to a second surface of the yoke which is rear surface of the first surface of the yoke;
a sensor magnet disposed above the yoke;
a hall sensor spaced apart from the sensor magnet; and
a sensor magnet supporter to which the sensor magnet is attached.

17. An image display apparatus including a camera apparatus
wherein the camera apparatus comprising:
a gyro sensor sensing a motion;
a prism apparatus for changing the angle of a light input to compensate the motion sensed by the gyro sensor about a first axis and a second axis and outputting the changed light;
a lens apparatus including a plurality of lenses and for realizing variable focus by moving at least one of the lenses and outputting the light from the prism apparatus by using the moving lens; and
an image sensor for converting the light from the lens apparatus to an electric signal,
wherein the prism apparatus comprises:
a prism holder for fixing a prism to a first surface;
a yoke of which a first surface is attached to a second surface of the prism holder which is rear surface of the first surface of the prism holder;
a drive magnet attached to a second surface of the yoke which is rear surface of the first surface of the yoke;
a sensor magnet disposed above the yoke;
a hall sensor spaced apart from the sensor magnet; and
a sensor magnet supporter to which the sensor magnet is attached.

18. The image display apparatus according to claim 17, wherein a distance between the sensor magnet and the hall sensor is less than a width of the sensor magnet.

19. The image display apparatus according to claim 17, wherein a width of the sensor magnet is greater than a width of the sensor magnet supporter.

20. The image display apparatus according to claim 17, wherein a ratio of the distance between the sensor magnet and the hall sensor, a width of the sensor magnet, and a width of the sensor magnet supporter is from 1:2:0.5 to 1:2:2.

* * * * *